United States Patent
Li et al.

(10) Patent No.: US 10,205,668 B2
(45) Date of Patent: Feb. 12, 2019

(54) VIDEO DATA TRANSMISSION METHOD AND RELATED DEVICE

(71) Applicant: Huawei Technologies Co., Ltd., Shenzhen (CN)

(72) Inventors: Zhiming Li, Shanghai (CN); Xiangyang Gong, Shenzhen (CN); Shiju Zhang, Shenzhen (CN); Mincheng Zhao, Shenzhen (CN); Zheng Shang, Shanghai (CN); Anni Wei, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 344 days.

(21) Appl. No.: 15/243,400

(22) Filed: Aug. 22, 2016

(65) Prior Publication Data

US 2016/0359755 A1 Dec. 8, 2016

Related U.S. Application Data

(63) Continuation of application No. PCT/CN2014/072421, filed on Feb. 22, 2014.

(51) Int. Cl.
*H04L 12/825* (2013.01)
*H04W 4/06* (2009.01)
(Continued)

(52) U.S. Cl.
CPC .......... *H04L 47/25* (2013.01); *H04B 17/318* (2015.01); *H04L 12/1407* (2013.01);
(Continued)

(58) Field of Classification Search
None
See application file for complete search history.

(56) References Cited

U.S. PATENT DOCUMENTS

2011/0021224 A1  1/2011  Koskinen et al.
2012/0259994 A1  10/2012  Gillies et al.
(Continued)

FOREIGN PATENT DOCUMENTS

CN    101232390 A    7/2008
CN    101388704 A    3/2009
(Continued)

OTHER PUBLICATIONS

"$3^{rd}$ Generation Partnership Project; Technical Specification Group Services and System Aspects; Transparent end-to-end Packet-switched Streaming Service (PSS); Protocols and codecs (Release 12)," 3GPP TS 26.234, V12.2.0, pp. 1-175, $3^{rd}$ Generation Partnership Project, Valbonne, France (Dec. 2013).
(Continued)

*Primary Examiner* — James P Duffy
(74) *Attorney, Agent, or Firm* — Leydig, Voit & Mayer, Ltd.

(57) ABSTRACT

Embodiments of the present invention disclose a video data transmission method and a related device. The method may include: when a base station receives information about a selection result and measurement configuration information, where the information about the selection result and the measurement configuration information are sent by a selection apparatus, determining, by the base station according to the selection result, that the present base station is a primary base station; acquiring, by the base station, channel quality information by using the measurement configuration information; and generating, by the base station, decision information according to the channel quality information and video service information that is acquired from a transmission conversion apparatus, and sending the decision information to the transmission conversion apparatus, which instructs a unicast service network element to perform
(Continued)

unicast transmission for video data and/or instructs a multicast service network element to perform multicast transmission for video data.

20 Claims, 13 Drawing Sheets

(51) Int. Cl.
    *H04L 29/06*      (2006.01)
    *H04L 29/08*      (2006.01)
    *H04B 17/318*     (2015.01)
    *H04L 12/14*      (2006.01)
    *H04W 8/20*       (2009.01)
    *H04W 24/08*      (2009.01)
    *H04W 72/04*      (2009.01)

(52) U.S. Cl.
    CPC ...... *H04L 65/4076* (2013.01); *H04L 65/4084* (2013.01); *H04L 65/602* (2013.01); *H04L 65/608* (2013.01); *H04L 65/80* (2013.01); *H04L 67/02* (2013.01); *H04W 4/06* (2013.01); *H04W 8/20* (2013.01); *H04W 24/08* (2013.01); *H04W 72/042* (2013.01); *H04W 72/0413* (2013.01)

(56) References Cited

U.S. PATENT DOCUMENTS

| 2012/0314596 | A1 | 12/2012 | Oikawa |
| 2013/0007814 | A1 | 1/2013 | Cherian et al. |
| 2016/0337676 | A1 | 11/2016 | Oyman |

FOREIGN PATENT DOCUMENTS

| CN | 102215174 A | 10/2011 |
| CN | 102611997 A | 7/2012 |
| CN | 103095708 A | 5/2013 |
| CN | 103249006 A | 8/2013 |
| CN | 103368940 A | 10/2013 |
| CN | 103369587 A | 10/2013 |
| JP | 2008219918 A | 9/2008 |
| JP | 2013004993 A | 1/2013 |
| JP | 2013179499 A | 9/2013 |
| JP | 2014517558 A | 7/2014 |
| WO | 2013016442 A1 | 1/2013 |

OTHER PUBLICATIONS

"3$^{rd}$ Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 12)," 3GPP TS 26.247, V12.1.0, pp. 1-117, 3$^{rd}$ Generation Partnership Project, Valbonne, France (Dec. 2013).

Paila et al., "FLUTE—File Delivery over Unidirectional Transport," Network Working Group, RFC 3926, pp. 1-35 (Oct. 2004).

"3rd Generation Partnership Project; Technical Specification Group Services and System Aspects; Study on architecture enhancements to support Group Communication System Enablers for LTE(GCSE_LTE) (Release 12)," 3GPP TR 23.768 V1.1.1, Technical Report, pp. 1-58, 3rd Generation Partnership Project, Valbonne, France (Jan. 2014).

"Draft TR 26.849 MI-MooD," 3GPP TSG SA4#76, Osaka, Japan, TDoc S4-131338, 3rd Generation Partnership Project, Valbonne, France (Nov. 4-8, 2013).

"3rd Generation Partnership Project; Technical Specification Group Services and System Aspects; MBMS Improvements; MBMS operation on Demand (Release 12)," 3GPP TR 26.849 V0.4.0, Technical Report, pp. 1-19, 3rd Generation Partnership Project, Valbonne, France (Nov. 2013).

3rd Generation Partnership Project; Technical Specification Group Services and System Aspects; Multimedia Broadcast/ Multicast Service (MBMS); Enhanced MBMS Operation (Release 12), 3GPP TR 26.848 V0.7.0, Technical Specification, pp. 1-35, 3rd Generation Partnership Project, Valbonne, France (Jan. 2014).

"Update on TR26.848 of EMO," TSG SA4#77 meeting, Seoul, Korea, Tdoc S4-140218, 3rd Generation Partnership Project, Valbonne, France (Jan. 20-24, 2014).

Guo et al.,"A Hybrid Transmission Approach for DASH over MBMS in LTE Network," IEEE 2015 Global Communications Conference (GLOBECOM), Institute of Electrical and Electronics Engineers, New York, New York (Dec. 6-10, 2015).

VIDEO DATA TRANSMISSION METHOD AND RELATED DEVICE

CROSS-REFERENCE TO RELATED APPLICATIONS

This application is a continuation of International Application No. PCT/CN2014/072421, filed on Feb. 22, 2014, which is hereby incorporated by reference in its entirety.

TECHNICAL FIELD

The present invention relates to the field of communications technologies, and in particular, to a video data transmission method and a related device.

BACKGROUND

A conventional Dynamic Adaptive Streaming over HTTP (DASH) service uses Hypertext transfer protocol (HTTP)-based unicast transmission. A unicast service provides a good effect when a small quantity of users request a DASH service, especially provides a good effect for a user whose channel quality is poor.

When a large quantity of users in a centralized area simultaneously request a video service with same content, and a DASH service is used to transmit video content for all the users, problems may occur, for example, radio resources are insufficient, and quality of a video provided for the users is degraded. A conventional DASH service can use only unicast transmission. Therefore, when a large quantity of users simultaneously request a video service with same content, the conventional DASH service cannot meet the user requirement.

SUMMARY

Embodiments of the present invention provide a video data transmission method and a related device, so as to meet requirements of more users by improving a transmission mode of a DASH service.

A first aspect of the present invention provides a base station, including:
  a determining module, configured to: when receiving information about a selection result and measurement configuration information that is used to instruct user equipment to perform a channel quality test, where the information about the selection result and the measurement configuration information are sent by a selection apparatus, determine, according to the selection result, that the present base station is a primary base station, where the selection result includes information about a primary base station and a secondary base station that are selected by the selection apparatus;
  a measurement information transceiver module, configured to send the measurement configuration information to user equipment and a secondary base station that are connected to the present base station, and receive channel quality information that is of user equipment connected to the secondary base station and that is fed back, according to the measurement configuration information, by the user equipment and the secondary base station that are connected to the present base station; and
  a decision module, configured to generate decision information according to the channel quality information and video service information that is acquired from a transmission conversion apparatus, and send the decision information to the transmission conversion apparatus, so that the transmission conversion apparatus instructs, according to the decision information, a unicast service network element to perform unicast transmission for video data and/or instructs, according to the decision information, a multicast service network element to perform multicast transmission for video data, where:
  the decision information includes a transmission mode and a transmission bit rate of the video data.

In a first possible implementation manner, the base station further includes:
  a video information acquiring module, configured to acquire the video service information from the transmission conversion apparatus by using a preset IP network-based interface, where:
  the video service information includes an address of the video data requested by the user equipment and video bit rate class information corresponding to the address of the video data, where the bit rate class information includes at least one bit rate corresponding to the video data; and
  the IP network-based interface is an interface configured to connect the base station and the transmission conversion apparatus.

With reference to the first aspect or the first possible implementation manner of the first aspect, in a second possible implementation manner,
  the channel quality information of the user equipment connected to the secondary base station is obtained, by the user equipment connected to the secondary base station, by performing measurement according to the measurement configuration information sent by the secondary base station.

With reference to the second possible implementation manner of the first aspect, in a third possible implementation manner, the decision module includes:
  a transmission mode selection unit, configured to select the transmission mode of the video data according to the channel quality information and the video service information that is acquired from the transmission conversion apparatus;
  a transmission bit rate selection unit, configured to select the transmission bit rate of the video data according to the channel quality information and the video service information that is acquired from the transmission conversion apparatus; and
  a decision sending unit, configured to send, to the transmission conversion apparatus, the decision information that carries the transmission mode of the video data and the transmission bit rate of the video data.

With reference to the third possible implementation manner of the first aspect, in a fourth possible implementation manner, the transmission mode selection unit includes:
  a reference bit rate selection subunit, configured to select, in the video bit rate class information included in the video service information and according to the channel quality information, a minimum bit rate that the video data can meet in both the unicast transmission and the multicast transmission as a reference bit rate;
  a consumed resource calculation subunit, configured to calculate a first total resource consumed at the reference bit rate in a unicast transmission mode, and calculate a second total resource consumed at the reference bit rate in a multicast transmission mode; and a transmission mode selection subunit, configured to select, by comparing the first total resource with the second total resource, a transmission mode in which a minimum total resource is consumed as the transmission mode of the video data.

With reference to the fourth possible implementation manner of the first aspect, in a fifth possible implementation manner, the transmission bit rate selection unit includes:
 a unit consumption calculation subunit, configured to separately calculate, according to the channel quality information and the video bit rate class information that is included in the video service information, a unit consumed resource that is of each piece of video data in the selected transmission mode and that is corresponding to each bit rate in the video bit rate class information, where the unit consumed resource is a resource consumed in each timeslot;
 a ratio calculation subunit, configured to separately calculate a calculation ratio of a peak signal to noise ratio of each piece of video data at each bit rate to a corresponding unit consumed resource;
 a sorting and traversal subunit, configured to generate, according to the calculation ratio, a sorting result of each piece of video data that is corresponding to each bit rate, and traverse the sorting result in a descending order;
 a ratio selection subunit, configured to select, in a traversal procedure, a minimum calculation ratio that can meet a preset resource condition; and
 a transmission bit rate selection subunit, configured to separately select, according to video data corresponding to a calculation ratio that is greater than or equal to the minimum calculation ratio that can meet the preset resource condition, a current maximum transmission bit rate corresponding to each piece of video data, where:
 a calculation ratio corresponding to the current maximum transmission bit rate of each piece of video data is greater than or equal to the minimum calculation ratio that can meet the preset resource condition; and
 the preset resource condition is that: a resource consumed in the multicast transmission mode is less than a first subframe quantity threshold, and total resources consumed in the multicast transmission mode and the unicast transmission mode are less than a second subframe quantity threshold.

With reference to the third possible implementation manner of the first aspect, or the fourth possible implementation manner of the first aspect, or the fifth possible implementation manner of the first aspect, in a sixth possible implementation manner,
 the channel quality information includes a signal to interference plus noise ratio (SINR) parameter measured by the user equipment in the unicast transmission mode, and a signal to interference plus noise ratio parameter measured by the user equipment in the multicast transmission mode; or
 the channel quality information includes a signal to interference plus noise ratio parameter measured by the user equipment in the unicast transmission mode, and channel quality of the present base station in the multicast transmission mode, where user equipment coverage of the present base station in the multicast transmission mode exceeds a preset coverage threshold.

With reference to the third possible implementation manner of the first aspect, or the fourth possible implementation manner of the first aspect, or the fifth possible implementation manner of the first aspect, or the sixth possible implementation manner of the first aspect, in a seventh possible implementation manner, the base station further includes:
 an update module, configured to: when a measurement time interval reaches a measurement period included in the measurement configuration information, receive updated channel quality information, and update the decision information so as to update the transmission bit rate of the video data.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, in an eighth possible implementation manner, the base station further includes:
 an identity information sending module, configured to send primary base station identity information to the transmission conversion apparatus, so that the transmission conversion apparatus determines, according to the primary base station identity information, that the present base station is the primary base station.

A second aspect of the present invention provides a transmission conversion apparatus, including:
 an acquiring module, configured to acquire video service information of a unicast service network element;
 a video information sending module, configured to send the video service information to a base station, so that the base station generates decision information according to the video service information and acquired channel quality information of each user equipment, where the base station is a primary base station selected by a selection apparatus; and
 a decision information receiving module, configured to receive the decision information sent by the base station, and separately send the decision information to the unicast service network element and a multicast service network element, so that the unicast service network element and the multicast service network element perform unicast transmission for video data and perform multicast transmission for video data respectively.

In a first possible implementation manner, the video information sending module is specifically configured to send the video service information to the base station by using a preset IP network-based interface, where:
 the video service information sent by the video information sending module includes an address of the video data requested by the user equipment and video bit rate class information corresponding to the address of the video data, where the bit rate class information includes at least one bit rate corresponding to the video data; and
 the IP network-based interface is an interface configured to connect the base station and the transmission conversion apparatus.

With reference to the second aspect or the first possible implementation manner of the second aspect, in a second possible implementation manner, the decision information includes a transmission mode of the video data and a transmission bit rate of the video data.

A third aspect of the present invention provides a selection apparatus, including:
- a selection result generating module, configured to select a primary base station and a secondary base station, and generate a selection result, where the selection result includes information about the primary base station and information about the secondary base station; and
- a selection result sending module, configured to send, to a base station, the selection result and measurement configuration information that is used to instruct user equipment to perform a channel quality test, so that the base station acquires channel quality information according to the selection result and the measurement configuration information, so as to generate decision information used to perform unicast transmission and/or multicast transmission for video data, where:
- the base station that receives the selection result is a base station corresponding to the information about the primary base station in the selection result.

In a first possible implementation manner, the selection result generating module includes:
- a first selection unit, configured to randomly select a base station in a network as the primary base station, and use another base station in the network as the secondary base station;
- a second selection unit, configured to select, in a network, a base station that is connected to a largest quantity of user equipments as the primary base station, and use another base station in the network as the secondary base station; or
- a third selection unit, configured to select, in a network, a base station that provides best hardware performance as the primary base station, and use another base station in the network as the secondary base station.

With reference to the third aspect or the first possible implementation manner of the third aspect, in a second possible implementation manner, the selection apparatus further includes:
- an identity information receiving module, configured to receive identity information and an E-UTRAN cell global identifier (ECGI) that are of user equipment corresponding to the present selection apparatus and that are sent by a policy and charging rules function (PCRF) network element; and
- a searching and sending module, configured to obtain, by searching according to the identity information and the ECGI of the user equipment, a base station corresponding to the user equipment, and send the identity information of the user equipment to the corresponding base station, where:
- the identity information and the ECGI of the user equipment are obtained by the PCRF network element by searching according to a user equipment network address sent by a unicast service network element.

A fourth aspect of the present invention provides a base station, including a processor, a communications interface, and a memory, where:
- the communications interface is configured to communicate with a transmission conversion apparatus, a selection apparatus, user equipment, and a secondary base station;
- the memory is configured to store a program; and
- the processor is configured to execute the program, so as to implement:
  - when receiving information about a selection result and measurement configuration information that is used to instruct the user equipment to perform a channel quality test, where the information about the selection result and the measurement configuration information are sent by the selection apparatus, determining, according to the selection result, that the present base station is a primary base station, where the selection result includes information about a primary base station and a secondary base station that are selected by the selection apparatus;
  - sending the measurement configuration information to user equipment and a secondary base station that are connected to the present base station, and receiving channel quality information that is of user equipment connected to the secondary base station and that is fed back, according to the measurement configuration information, by the user equipment and the secondary base station that are connected to the present base station; and
  - generating decision information according to the channel quality information and video service information that is acquired from the transmission conversion apparatus, and sending the decision information to the transmission conversion apparatus, so that the transmission conversion apparatus instructs, according to the decision information, a unicast service network element to perform unicast transmission for video data and/or instructs, according to the decision information, a multicast service network element to perform multicast transmission for video data, where:
  - the decision information includes a transmission mode and a transmission bit rate of the video data.

In a first possible implementation manner, the processor is further configured to:
- acquire the video service information from the transmission conversion apparatus by using a preset IP network-based interface, where:
  - the video service information includes an address of the video data requested by the user equipment and video bit rate class information corresponding to the address of the video data, where the bit rate class information includes at least one bit rate corresponding to the video data; and
- the IP network-based interface is an interface configured to connect the base station and the transmission conversion apparatus.

With reference to the fourth aspect or the first possible implementation manner of the fourth aspect, in a second possible implementation manner,
- the channel quality information of the user equipment connected to the secondary base station is obtained, by the user equipment connected to the secondary base station, by performing measurement according to the measurement configuration information sent by the secondary base station.

With reference to the second possible implementation manner of the fourth aspect, in a third possible implementation manner, the processor is specifically configured to:
- select the transmission mode of the video data according to the channel quality information and the video service information that is acquired from the transmission conversion apparatus;
- select the transmission bit rate of the video data according to the channel quality information and the video service information that is acquired from the transmission conversion apparatus; and send, to the transmission conversion apparatus, the decision information that carries the transmission mode of the video data and the transmission bit rate of the video data.

With reference to the third possible implementation manner of the fourth aspect, in a fourth possible implementation manner, the processor is specifically configured to:
select, in the video bit rate class information included in the video service information and according to the channel quality information, a minimum bit rate that the video data can meet in both the unicast transmission and the multicast transmission as a reference bit rate;
calculate a first total resource consumed at the reference bit rate in a unicast transmission mode, and calculate a second total resource consumed at the reference bit rate in a multicast transmission mode; and
select, by comparing the first total resource with the second total resource, a transmission mode in which a minimum total resource is consumed as the transmission mode of the video data.

With reference to the fourth possible implementation manner of the fourth aspect, in a fifth possible implementation manner, the processor is specifically configured to:
separately calculate, according to the channel quality information and the video bit rate class information that is included in the video service information, a unit consumed resource that is of each piece of video data in the selected transmission mode and that is corresponding to each bit rate in the video bit rate class information, where the unit consumed resource is a resource consumed in each timeslot;
separately calculate a calculation ratio of a peak signal to noise ratio of each piece of video data at each bit rate to a corresponding unit consumed resource;
generate, according to the calculation ratio, a sorting result of each piece of video data that is corresponding to each bit rate, and traverse the sorting result in a descending order;
select, in a traversal procedure, a minimum calculation ratio that can meet a preset resource condition; and
separately select, according to video data corresponding to a calculation ratio that is greater than or equal to the minimum calculation ratio that can meet the preset resource condition, a current maximum transmission bit rate corresponding to each piece of video data, where:
a calculation ratio corresponding to the current maximum transmission bit rate of each piece of video data is greater than or equal to the minimum calculation ratio that can meet the preset resource condition; and
the preset resource condition is that: a resource consumed in the multicast transmission mode is less than a first subframe quantity threshold, and total resources consumed in the multicast transmission mode and the unicast transmission mode are less than a second subframe quantity threshold.

With reference to the third possible implementation manner of the fourth aspect, or the fourth possible implementation manner of the fourth aspect, or the fifth possible implementation manner of the fourth aspect, in a sixth possible implementation manner,
the channel quality information includes a signal to interference plus noise ratio (SINR) parameter measured by the user equipment in the unicast transmission mode, and a signal to interference plus noise ratio parameter measured by the user equipment in the multicast transmission mode; or the channel quality information includes a signal to interference plus noise ratio parameter measured by the user equipment in the unicast transmission mode, and channel quality of the present base station in the multicast transmission mode, where user equipment coverage of the present base station in the multicast transmission mode exceeds a preset coverage threshold.

With reference to the third possible implementation manner of the fourth aspect, or the fourth possible implementation manner of the fourth aspect, or the fifth possible implementation manner of the fourth aspect, or the sixth possible implementation manner of the fourth aspect, in a seventh possible implementation manner, the processor is further configured to:
when a measurement time interval reaches a measurement period included in the measurement configuration information, receive updated channel quality information, and update the decision information so as to update the transmission bit rate of the video data.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, or the sixth possible implementation manner of the fourth aspect, or the seventh possible implementation manner of the fourth aspect, in an eighth possible implementation manner, the processor is further configured to:
send primary base station identity information to the transmission conversion apparatus, so that the transmission conversion apparatus determines, according to the primary base station identity information, that the present base station is the primary base station.

A fifth aspect of the present invention provides a transmission conversion apparatus, including a processor, a communications interface, and a memory, where:
the communications interface is configured to communicate with a base station, a unicast service network element, and a multicast service network element;
the memory is configured to store a program; and
the processor is configured to execute the program, so as to implement:
acquiring video service information of the unicast service network element;
sending the video service information to the base station, so that the base station generates decision information according to the video service information and acquired channel quality information of each user equipment, where the base station is a primary base station selected by a selection apparatus; and
receiving the decision information sent by the base station, and separately sending the decision information to the unicast service network element and the multicast service network element, so that the unicast service network element and the multicast service network element perform unicast transmission for video data and perform multicast transmission for video data respectively.

In a first possible implementation manner, the processor is specifically configured to:
send the video service information to the base station by using a preset IP network-based interface, where:
the video service information includes an address of the video data requested by the user equipment and video bit rate class information corresponding to the address of the video data, where the bit rate class information includes at least one bit rate corresponding to the video data; and the IP network-based interface is an interface configured to connect the base station and the transmission conversion apparatus.

With reference to the fifth aspect or the first possible implementation manner of the fifth aspect, in a second possible implementation manner, the decision information includes a transmission mode of the video data and a transmission bit rate of the video data.

A sixth aspect of the present invention provides a selection apparatus, including a processor, a communications interface, and a memory, where:

the communications interface is configured to communicate with a PCRF policy and charging rules function network element and a base station;

the memory is configured to store a program; and the processor is configured to execute the program, so as to implement:

selecting a primary base station and a secondary base station, and generating a selection result, where the selection result includes information about the primary base station and information about the secondary base station; and sending, to a base station, the selection result and measurement configuration information that is used to instruct user equipment to perform a channel quality test, so that the base station acquires channel quality information according to the selection result and the measurement configuration information, so as to generate decision information used to perform unicast transmission and/or multicast transmission for video data, where:

the base station that receives the selection result is a base station corresponding to the information about the primary base station in the selection result.

In a first possible implementation manner, the processor is specifically configured to:

randomly select a base station in a network as the primary base station, and use another base station in the network as the secondary base station; or select, in a network, a base station that is connected to a largest quantity of user equipments as the primary base station, and use another base station in the network as the secondary base station; or select, in a network, a base station that provides best hardware performance as the primary base station, and use another base station in the network as the secondary base station.

With reference to the sixth aspect or the first possible implementation manner of the sixth aspect, in a second possible implementation manner, the processor is further configured to:

receive identity information and an E-UTRAN cell global identifier (ECGI) that are of user equipment corresponding to the present selection apparatus and that are sent by the policy and charging rules function (PCRF) network element; and obtain, by searching according to the identity information and the ECGI of the user equipment, a base station corresponding to the user equipment, and send the identity information of the user equipment to the corresponding base station, where:

the identity information and the ECGI of the user equipment are obtained by the PCRF network element by searching according to a user equipment network address sent by a unicast service network element.

A seventh aspect of the present invention provides a video data transmission method, including:

when a base station receives information about a selection result and measurement configuration information that is used to instruct user equipment to perform a channel quality test, where the information about the selection result and the measurement configuration information are sent by a selection apparatus, determining, by the base station according to the selection result, that the present base station is a primary base station, where the selection result includes information about a primary base station and a secondary base station that are selected by the selection apparatus;

sending, by the base station, the measurement configuration information to user equipment and a secondary base station that are connected to the present base station, and receiving channel quality information that is of user equipment connected to the secondary base station and that is fed back, according to the measurement configuration information, by the user equipment and the secondary base station that are connected to the present base station; and generating, by the base station, decision information according to the channel quality information and video service information that is acquired from a transmission conversion apparatus, and sending the decision information to the transmission conversion apparatus, so that the transmission conversion apparatus instructs, according to the decision information, a unicast service network element to perform unicast transmission for video data and/or instructs, according to the decision information, a multicast service network element to perform multicast transmission for video data, where:

the decision information includes a transmission mode and a transmission bit rate of the video data.

In a first possible implementation manner, before the step of generating, by the base station, decision information according to the channel quality information and video service information that is acquired from a transmission conversion apparatus, and sending the decision information to the transmission conversion apparatus, the method further includes:

acquiring, by the base station, the video service information from the transmission conversion apparatus by using a preset IP network-based interface, where:

the video service information includes an address of the video data requested by the user equipment and video bit rate class information corresponding to the address of the video data, where the bit rate class information includes at least one bit rate corresponding to the video data; and the IP network-based interface is an interface configured to connect the base station and the transmission conversion apparatus.

With reference to the seventh aspect or the first possible implementation manner of the seventh aspect, in a second possible implementation manner, the channel quality information of the user equipment connected to the secondary base station is obtained, by the user equipment connected to the secondary base station, by performing measurement according to the measurement configuration information sent by the secondary base station.

With reference to the second possible implementation manner of the seventh aspect, in a third possible implementation manner, the generating, by the base station, decision information according to the channel quality information and video service information that is acquired from a transmission conversion apparatus, and sending the decision information to the transmission conversion apparatus includes:

selecting, by the base station, the transmission mode of the video data according to the channel quality information and the video service information that is acquired from the transmission conversion apparatus;

selecting, by the base station, the transmission bit rate of the video data according to the channel quality information and the video service information that is acquired from the transmission conversion apparatus; and sending, by the base station, to the transmission conversion apparatus, the decision information that carries the transmission mode of the video data and the transmission bit rate of the video data.

With reference to the third possible implementation manner of the seventh aspect, in a fourth possible implementation manner, the selecting, by the base station, the transmission mode of the video data according to the channel quality information and the video service information that is acquired from the transmission conversion apparatus includes:

selecting, by the base station, in the video bit rate class information included in the video service information and according to the channel quality information, a minimum bit rate that the video data can meet in both the unicast transmission and the multicast transmission as a reference bit rate;

calculating, by the base station, a first total resource consumed at the reference bit rate in a unicast transmission mode, and calculating a second total resource consumed at the reference bit rate in a multicast transmission mode; and selecting, by the base station by comparing the first total resource with the second total resource, a transmission mode in which a minimum total resource is consumed as the transmission mode of the video data.

With reference to the fourth possible implementation manner of the seventh aspect, in a fifth possible implementation manner, the selecting, by the base station, the transmission bit rate of the video data according to the channel quality information and the video service information that is acquired from the transmission conversion apparatus includes:

separately calculating, by the base station according to the channel quality information and the video bit rate class information that is included in the video service information, a unit consumed resource that is of each piece of video data in the selected transmission mode and that is corresponding to each bit rate in the video bit rate class information, where the unit consumed resource is a resource consumed in each timeslot;

separately calculating, by the base station, a calculation ratio of a peak signal to noise ratio of each piece of video data at each bit rate to a corresponding unit consumed resource;

generating, by the base station according to the calculation ratio, a sorting result of each piece of video data that is corresponding to each bit rate, and traversing the sorting result in a descending order;

selecting, by the base station, in a traversal procedure, a minimum calculation ratio that can meet a preset resource condition; and separately selecting, by the base station according to video data corresponding to a calculation ratio that is greater than or equal to the minimum calculation ratio that can meet the preset resource condition, a current maximum transmission bit rate corresponding to each piece of video data, where:

a calculation ratio corresponding to the current maximum transmission bit rate of each piece of video data is greater than or equal to the minimum calculation ratio that can meet the preset resource condition; and the preset resource condition is that: a resource consumed in the multicast transmission mode is less than a first subframe quantity threshold, and total resources consumed in the multicast transmission mode and the unicast transmission mode are less than a second subframe quantity threshold.

With reference to the third possible implementation manner of the seventh aspect, or the fourth possible implementation manner of the seventh aspect, or the fifth possible implementation manner of the seventh aspect, in a sixth possible implementation manner, the channel quality information includes a signal to interference plus noise ratio (SINR) parameter measured by the user equipment in the unicast transmission mode, and a signal to interference plus noise ratio parameter measured by the user equipment in the multicast transmission mode; or the channel quality information includes a signal to interference plus noise ratio parameter measured by the user equipment in the unicast transmission mode, and channel quality of the present base station in the multicast transmission mode, where user equipment coverage of the present base station in the multicast transmission mode exceeds a preset coverage threshold.

With reference to the third possible implementation manner of the seventh aspect, or the fourth possible implementation manner of the seventh aspect, or the fifth possible implementation manner of the seventh aspect, or the sixth possible implementation manner of the seventh aspect, in a seventh possible implementation manner, the method further includes:

when a measurement time interval reaches a measurement period included in the measurement configuration information, receiving, by the base station, updated channel quality information, and updating the decision information so as to update the transmission bit rate of the video data.

With reference to the seventh aspect, or the first possible implementation manner of the seventh aspect, or the second possible implementation manner of the seventh aspect, or the third possible implementation manner of the seventh aspect, or the fourth possible implementation manner of the seventh aspect, or the fifth possible implementation manner of the seventh aspect, or the sixth possible implementation manner of the seventh aspect, or the seventh possible implementation manner of the seventh aspect, in an eighth possible implementation manner, the method further includes:

sending, by the base station, primary base station identity information to the transmission conversion apparatus, so that the transmission conversion apparatus determines, according to the primary base station identity information, that the present base station is the primary base station.

An eighth aspect of the present invention provides a video data transmission method, including:

acquiring, by a transmission conversion apparatus, video service information of a unicast service network element;

sending, by the transmission conversion apparatus, the video service information to a base station, so that the base station generates decision information according to the video service information and acquired channel quality information of each user equipment, where the base station is a primary base station selected by a selection apparatus; and receiving, by the transmission conversion apparatus, the decision information sent by the base station, and separately sending the decision information to the unicast service network element and a multicast service network element, so that the unicast service network element and the multicast service network element perform unicast transmission for video data and perform multicast transmission for video data respectively.

In a first possible implementation manner, the sending, by the transmission conversion apparatus, the video service information to a base station includes:

sending, by the transmission conversion apparatus, the video service information to the base station by using a preset IP network-based interface, where:

the video service information includes an address of the video data requested by the user equipment and video bit rate class information corresponding to the address of the video data, where the bit rate class information includes at least one bit rate corresponding to the video data; and the IP network-based interface is an interface configured to connect the base station and the transmission conversion apparatus.

With reference to the eighth aspect or the first possible implementation manner of the eighth aspect, in a second possible implementation manner, the decision information includes a transmission mode of the video data and a transmission bit rate of the video data.

A ninth aspect of the present invention provides a video data transmission method, including:

selecting, by a selection apparatus, a primary base station and a secondary base station, and generating a selection result, where the selection result includes information about the primary base station and information about the secondary base station; and sending, to a base station by the selection apparatus, the selection result and measurement configuration information that is used to instruct user equipment to perform a channel quality test, so that the base station acquires channel quality information according to the selection result and the measurement configuration information, so as to generate decision information used to perform unicast transmission and/or multicast transmission for video data, where:

the base station that receives the selection result is a base station corresponding to the information about the primary base station in the selection result.

In a first possible implementation manner, the selecting, by a selection apparatus, a primary base station and a secondary base station includes:

randomly selecting a base station in a network as the primary base station, and using another base station in the network as the secondary base station; or selecting, in a network, a base station that is connected to a largest quantity of user equipments as the primary base station, and using another base station in the network as the secondary base station; or selecting, in a network, a base station that provides best hardware performance as the primary base station, and using another base station in the network as the secondary base station.

With reference to the ninth aspect or the first possible implementation manner of the ninth aspect, in a second possible implementation manner, before the step of generating, by the selection apparatus, a selection result according to a selection rule, the method further includes:

receiving, by the selection apparatus, identity information and an E-UTRAN cell global identifier (ECGI) that are of user equipment corresponding to the present selection apparatus and that are sent by a policy and charging rules function (PCRF) network element; and obtaining, by the selection apparatus by searching according to the identity information and the ECGI of the user equipment, a base station corresponding to the user equipment, and sending the identity information of the user equipment to the corresponding base station, where:

the identity information and the ECGI of the user equipment are obtained by the PCRF network element by searching according to a user equipment network address sent by a unicast service network element.

A tenth aspect of the present invention provides a computer storage medium, where:

the computer storage medium may store a program, and some or all of the steps of the video data transmission method provided in the seventh aspect are included when the program is executed.

An eleventh aspect of the present invention provides a computer storage medium, where:

the computer storage medium may store a program, and some or all of the steps of the video data transmission method provided in the eighth aspect are included when the program is executed.

A twelfth aspect of the present invention provides a computer storage medium, where:

the computer storage medium may store a program, and some or all of the steps of the video data transmission method provided in the ninth aspect are included when the program is executed.

It can be seen from the foregoing that, according to the embodiments of the present invention, decision information may be generated by collecting channel quality information and video service information of user equipment, so that a unicast service network element and a multicast service network element may control, according to the decision information, corresponding DASH video data to be transmitted by means of unicast or by means of multicast respectively. Therefore, a DASH service that supports a hybrid unicast and multicast transmission mode can better use a radio resource such as network bandwidth, and provide higher video quality for users, so as to meet various user requirements.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
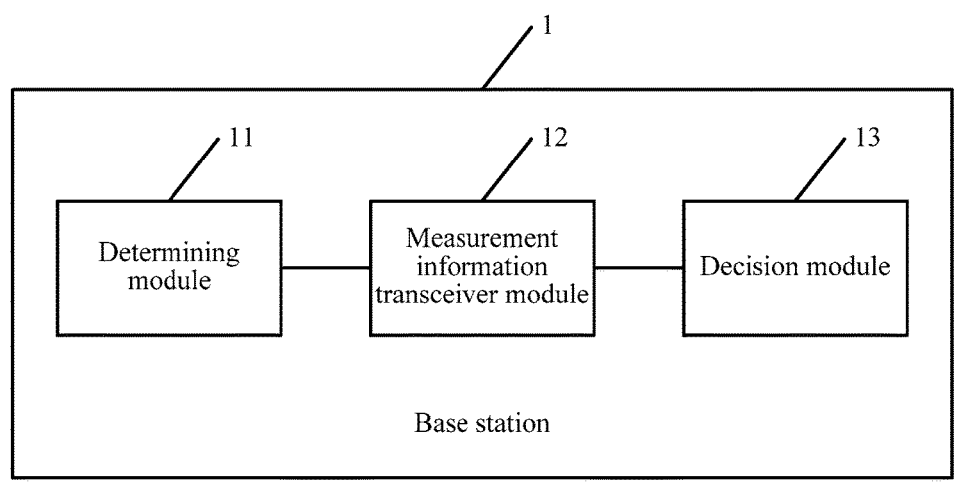
FIG. 1 is a schematic structural diagram of a base station according to an embodiment of the present invention.

Referring to FIG. 1, FIG. 1 is a schematic structural diagram of a base station 1 according to an embodiment of the present invention. The base station 1 includes: a determining module 11, a measurement information transceiver module 12, and a decision module 13.

The determining module 11 is configured to: when receiving information about a selection result and measurement configuration information that is used to instruct user equipment to perform a channel quality test, where the information about the selection result and the measurement configuration information are sent by a selection apparatus, determine, according to the selection result, that the present base station is a primary base station, where the selection result includes information about a primary base station and a secondary base station that are selected by the selection apparatus.

Specifically, when the determining module 11 receives the information about the selection result and the measurement configuration information that is used to instruct the user equipment to perform the channel quality test, where the information about the selection result and the measurement configuration information are sent by the selection apparatus, the determining module 11 may determine, according to the selection result, that the present base station is the primary base station. In addition, the determining module 11 may further know that another base station in a network is the secondary base station. The selection result includes the information about the primary base station selected by the selection apparatus according to a selection rule and the information about the secondary base station selected by the selection apparatus according to the selection rule. The selection apparatus may be an MME (Mobility Management Entity, mobility management entity) network element or an MCE (Multi-cell/multicast Coordination Entity, multi-cell/multicast coordination entity) network element. The selection rule may be: randomly selecting a base station in the network as the primary base station, and using another base station in the network as the secondary base station; or selecting, in the network, a base station that is connected to a largest quantity of user equipments as the primary base station, and using another base station in the network as the secondary base station.

Before the selection apparatus sends the selection result, the selection apparatus may search, according to identity information and an ECGI (E-UTRAN Cell Global Identifier, E-UTRAN cell global identifier) that are of the user equipment and that are sent by a PCRF (Policy and Charging Rules Function, policy and charging rules function) network element, for a base station corresponding to the user equipment, and send the identity information of the user equipment to the corresponding base station, so that when collecting channel quality information of the user equipment, each base station may instruct the user equipment that is indicated by the received identity information of the user equipment to perform measurement, where the identity information of the user equipment refers to identity information of user equipment that requests DASH video data.

Before the selection apparatus receives the identity information and the ECGI that are of the user equipment and that are sent by the PCRF network element, a unicast service network element may send known user equipment information to the PCRF network element, so that the PCRF network element may query, according to the user equipment information, for the identity information and the ECGI of the corresponding user equipment. The PCRF network element may obtain, by querying according to the identity information and the ECGI of the user equipment, the selection apparatus to which the user equipment belongs, and send the identity information of the user equipment to the corresponding selection apparatus. The unicast service network element may be a DASH Proxy (DASH Proxy, DASH proxy) network element. For example, the DASH Proxy network element sends a user equipment network address to the PCRF network element. Then the PCRF network element queries for the identity information and the ECGI of the corresponding user equipment according to the user equipment network address; determines, according to the identity information and the ECGI of the corresponding user equipment, the MME network element to which the user equipment belongs; and sends the identity information and the ECGI of the corresponding user equipment to the MME network element by using a serving gateway. The MME network element determines, according to identity information of all base stations in the network, a base station corresponding to identity information of each user equipment, and sends the identity information of each user equipment to the base station corresponding to the user equipment, so that each base station may know user equipment that is connected to the base station and that requests DASH video data.

The measurement information transceiver module 12 is configured to send the measurement configuration information to user equipment and a secondary base station that are connected to the present base station, and receive channel quality information that is of user equipment connected to the secondary base station and that is fed back, according to the measurement configuration information, by the user equipment and the secondary base station that are connected to the present base station.

Specifically, the measurement information transceiver module 12 may send the measurement configuration information to the user equipment and the secondary base station that are connected to the present base station. When the user equipment connected to the present base station receives the measurement configuration information, the user equipment connected to the present base station may separately measure, according to the measurement configuration information, channel quality in a unicast transmission mode and channel quality in a multicast transmission mode; or measure channel quality only in a unicast transmission mode. The measurement information transceiver module 12 receives channel quality information obtained by measurement by the user equipment connected to the present base station. When the secondary base station receives the measurement configuration information, the secondary base station may deliver the measurement configuration information to the user equipment connected to the secondary base station, and receive channel quality information uploaded by the user equipment connected to the secondary base station. The measurement information transceiver module 12 may receive the channel quality information uploaded by the secondary base station.

The measurement configuration information may include a measurement parameter and a measurement period of the user equipment for channel quality. When the user equipment has a capability of measuring channel quality in the multicast transmission mode, the measurement parameter of the user equipment for the channel quality may include a measurement parameter of channel quality in the unicast transmission mode and a measurement parameter of channel quality in the multicast transmission mode; or when the user equipment has no capability of measuring channel quality information in the multicast transmission mode, the measurement parameter of the user equipment for the channel quality may include a measurement parameter of channel quality in the unicast transmission mode.

The channel quality information includes the channel quality information of the user equipment connected to the present base station and the channel quality information of the user equipment connected to the secondary base station. The channel quality information is a Signal to Interference plus Noise Ratio (SINR) parameter measured by the user equipment in the unicast transmission mode, or an SINR signal to interference plus noise ratio parameter separately measured by the user equipment in the unicast transmission mode and in the multicast transmission mode.

The channel quality information of the user equipment connected to the secondary base station is obtained, by the user equipment connected to the secondary base station, by performing measurement according to the measurement configuration information sent by the secondary base station.

The base station is interconnected with and communicates with each secondary base station by using a Mesh (Mesh, wireless mesh network).

The decision module 13 is configured to generate decision information according to the channel quality information and video service information that is acquired from a transmission conversion apparatus, and send the decision information to the transmission conversion apparatus, so that the transmission conversion apparatus instructs, according to the decision information, the unicast service network element to perform unicast transmission for video data and/or instructs, according to the decision information, a multicast service network element to perform multicast transmission for video data.

Specifically, the decision module 13 may generate the decision information according to the channel quality information and the video service information that is acquired from the transmission conversion apparatus, and send the decision information to the transmission conversion apparatus. The decision information includes a transmission mode and a transmission bit rate of the video data. The transmission conversion apparatus may send the decision information to the unicast service network element and the multicast service network element. In this case, the unicast service network element may perform, at a current transmission bit rate, unicast transmission for the corresponding DASH video data according to the transmission mode and the transmission bit rate that are of the video data and that are included in the decision information; the multicast service network element may perform, at a current transmission bit rate, multicast transmission for the corresponding DASH video data according to the transmission mode and the transmission bit rate that are of the video data and that are included in the decision information. For example, video data requested by a small quantity of users may be transmitted in the unicast transmission mode; and video data requested by a large quantity of users at the same time may be transmitted in the multicast transmission mode, for example, may be transmitted in an MBSFN (Multicast Broadcast Single Frequency Network, Multicast Broadcast Single Frequency Network) transmission mode. In this mixed unicast and multicast transmission mode, frequency resources can be reduced, and spectrum utilization can be increased, so that a DASH service can better use a radio resource such as network bandwidth.

The multicast service network element may be a broadcast/multicast service center (BM-SC) network element. The transmission conversion apparatus is a newly added control management entity configured to perform unicast and multicast conversion for a DASH service. The transmission conversion apparatus may be disposed in an entity such as a DASH Proxy network element, a BM-SC network element, or a public data network gateway (P-GW). Because the transmission conversion apparatus is a newly added entity, there is no defined interface between the transmission conversion apparatus and the base station for performing communication. Therefore, reference may be made to an existing interface between a multimedia broadcast multicast gateway and the base station, where the interface is a pure user-plane interface and is an Internet Protocol (IP) network-based interface, so that an interface defined between the transmission conversion apparatus and the base station is the same as the interface defined between the multimedia broadcast multicast gateway and the base station.

The video service information includes an address of the video data requested by the user equipment and video bit rate class information corresponding to the address of the video data, where the bit rate class information includes at least one bit rate corresponding to the video data. The base station may collect the video service information in the transmission conversion apparatus. The transmission conversion apparatus acquires the video service information from the unicast service network element. When the unicast service network element forwards a media representation description that is returned by a DASH server to the user equipment, the unicast service network element intercepts and parses the media representation description, so as to acquire the video service information. For example, the transmission conversion apparatus may acquire an address Uniform Resource Locator (URL) and video bit rate class information that are of video data that is requested by the user equipment and is sent by the unicast service network element, where the video bit rate class information includes 688 kbps, 1427 kbps, and 2056 kbps.

When the user equipment can measure unicast and multicast channel quality, the decision module 13 may generate the decision information according to a capacity maximization rule, the channel quality information, and the video service information that is acquired from the transmission conversion apparatus. When the user equipment can measure only unicast channel quality, the decision module 13 may generate the decision information according to a capacity maximization rule, the channel quality information, channel quality of the present base station in the multicast transmission mode, and the video service information that is acquired from the transmission conversion apparatus. In this case, user equipment coverage of the base station in the multicast transmission mode exceeds a preset coverage threshold. For example, the base station uses, as a reference multicast signal to noise ratio, channel quality at which 95% of user equipments that perform transmission in the multicast transmission mode are covered.

The capacity maximization rule refers to: within a particular network resource, making a quantity of users who can obtain a video service reach a maximum value that can be supported by the current network resource, and in addition, making quality of the video service obtained by the users reach a maximum value that can be supported by the current network resource. The capacity maximization rule may be set according to a size of a total consumed resource and a video quality PSNR (Peak Signal to noise Ratio, peak signal to noise ratio). That is, the capacity maximization rule may enable a consideration of balancing between a quantity of users who obtain a video service and video service quality, so that both the user quantity and the video service quality reach a maximum value. A transmission bit rate may be selected according to the capacity maximization rule, so that more users can obtain a high-quality video service.

Figure 2:
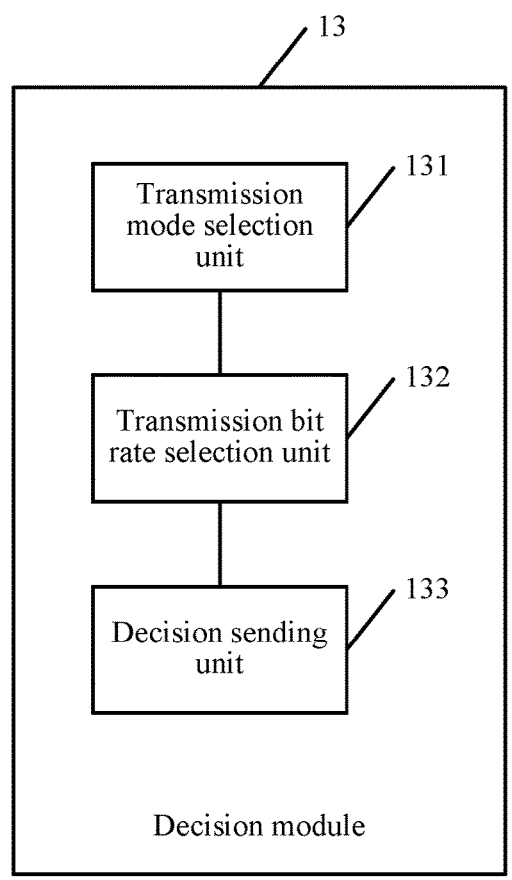
FIG. 2 is a schematic structural diagram of a decision module according to an embodiment of the present invention.

Further, referring to FIG. 2, FIG. 2 is a schematic structural diagram of a decision module 13 according to an embodiment of the present invention. The decision module 13 may include: a transmission mode selection unit 131, a transmission bit rate selection unit 132, and a decision sending unit 133.

The transmission mode selection unit 131 is configured to select a transmission mode of video data according to channel quality information and video service information that is acquired from a transmission conversion apparatus.

Specifically, the transmission mode selection unit 131 may select the transmission mode of the video data according to the channel quality information and the video service information that is acquired from the transmission conversion apparatus. The transmission mode selection unit 131 may separately calculate, according to the channel quality information, a total resource consumed by the video data in a unicast transmission mode and a total resource consumed by the video data in a multicast transmission mode. The transmission mode selection unit 131 selects a transmission mode in which a smaller total resource is consumed as the transmission mode of the video data.

The transmission bit rate selection unit 132 is configured to select a transmission bit rate of the video data according to the channel quality information and the video service information that is acquired from the transmission conversion apparatus.

Specifically, after the transmission mode selection unit 131 selects the corresponding transmission mode, the transmission bit rate selection unit 132 may select the transmission bit rate of the video data according to a capacity maximization rule, the channel quality information, and the video service information that is acquired from the transmission conversion apparatus. Firstly, the transmission bit rate selection unit 132 may separately calculate, according to the channel quality information, a unit consumed resource that is of each piece of video data in the selected transmission mode and that is corresponding to each bit rate in video bit rate class information. Then, the transmission bit rate selection unit 132 may select, according to a video quality PSNR corresponding to each DASH bit rate in each piece of video data and according to the corresponding unit consumed resource, a transmission bit rate of a transmission mode corresponding to each piece of video data. An objective of selecting a transmission bit rate by the transmission bit rate selection unit 132 is to preferentially serve, as much as possible, a service or user that brings about a higher RSNR on each RB.

The decision sending unit 133 is configured to send, to the transmission conversion apparatus, decision information that carries the transmission mode of the video data and the transmission bit rate of the video data.

After the transmission mode selection unit 131 and the transmission bit rate selection unit 132 select the corresponding transmission mode and the corresponding transmission bit rate respectively, the decision sending unit 133 may send, to the transmission conversion apparatus, the decision information that carries the transmission mode of the video data and the transmission bit rate of the video data, so that the transmission conversion apparatus may send the decision information to a unicast service network element and a multicast service network element. In this case, the unicast service network element may perform, at a current transmission bit rate, unicast transmission for the corresponding DASH video data according to the transmission mode and the transmission bit rate that are of the video data and that are included in the decision information; the multicast service network element may perform, at a current transmission bit rate, multicast transmission for the corresponding DASH video data according to the transmission mode and the transmission bit rate that are of the video data and that are included in the decision information. For example, video data requested by a small quantity of users may be transmitted in the unicast transmission mode; and video data requested by a large quantity of users at the same time may be transmitted in the multicast transmission mode, for example, may be transmitted in an MBSFN transmission mode. In this transmission mode, frequency resources can be reduced, and spectrum utilization can be increased, so that a DASH service can better use a radio resource such as network bandwidth.

The channel quality information may include a signal to interference plus noise ratio parameter measured by user equipment in the unicast transmission mode and a signal to interference plus noise ratio parameter measured by the user equipment in the multicast transmission mode; or the channel quality information includes a signal to interference plus noise ratio parameter measured by user equipment in the unicast transmission mode, and channel quality of a base station in the multicast transmission mode, where user equipment coverage of the present base station in the multicast transmission mode exceeds a preset coverage threshold.

Figure 3:
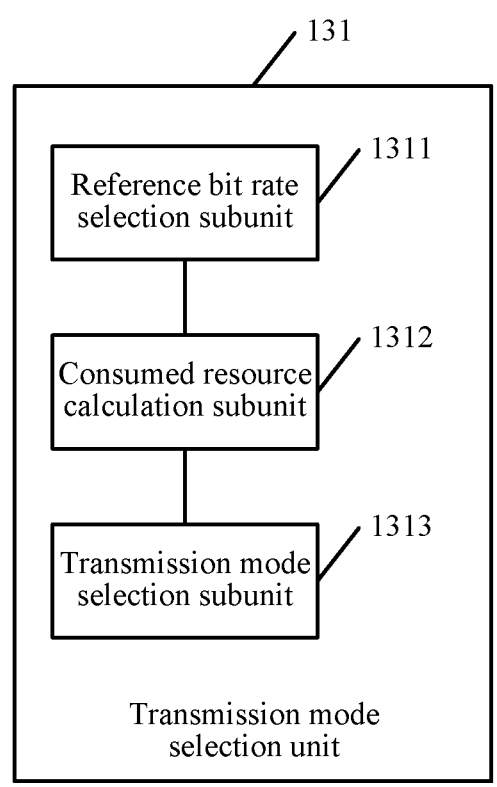
FIG. 3 is a schematic structural diagram of a transmission mode selection unit according to an embodiment of the present invention.

Further, referring to FIG. 3, FIG. 3 is a schematic structural diagram of a transmission mode selection unit 131 according to an embodiment of the present invention. The transmission mode selection unit 131 may include: a reference bit rate selection subunit 1311, a consumed resource calculation subunit 1312, and a transmission mode selection subunit 1313.

The reference bit rate selection subunit 1311 is configured to select, in video bit rate class information included in video service information and according to channel quality information, a minimum bit rate that video data can meet in both unicast transmission and multicast transmission as a reference bit rate.

Specifically, the reference bit rate selection subunit 1311 may select, in the video bit rate class information included in the video service information and according to the channel quality information, the minimum bit rate that the video data can meet in both the unicast transmission and the multicast transmission as the reference bit rate. For example, for particular video data, video bit rate class information corresponding to the video data includes three bit rate classes, that is, class 1, class 2, and class 3. If a class 1 bit rate is a minimum bit rate that the video data can meet in both the unicast transmission and the multicast transmission, the class 1 bit rate is used as a reference bit rate.

The consumed resource calculation subunit 1312 is configured to calculate a first total resource consumed at the reference bit rate in a unicast transmission mode, and calculate a second total resource consumed at the reference bit rate in a multicast transmission mode.

For particular video data, the consumed resource calculation subunit 1312 may calculate a first total resource consumed at the reference bit rate in the unicast transmission mode, and calculate a second total resource consumed at the reference bit rate in the multicast transmission mode.

The transmission mode selection subunit 1313 is configured to select, by comparing the first total resource with the second total resource, a transmission mode in which a minimum total resource is consumed as a transmission mode of the video data.

When the transmission mode selection subunit 1313 learns, by comparison, that a first total resource consumed by particular video data at the reference bit rate in the unicast transmission mode is less than a second total resource consumed by the video data at the reference bit rate in the multicast transmission mode, the transmission mode selection subunit 1313 selects the unicast transmission mode to transmit the video data; when the transmission mode selection subunit 1313 learns, by comparison, that a first total resource consumed by particular video data at the reference bit rate in the unicast transmission mode is greater than a second total resource consumed by the video data at the reference bit rate in the multicast transmission mode, the transmission mode selection subunit 1313 selects the multicast transmission mode to transmit the video data.

The channel quality information may include a signal to interference plus noise ratio parameter measured by user equipment in the unicast transmission mode, and a signal to interference plus noise ratio parameter measured by the user equipment in the multicast transmission mode; or the channel quality information includes a signal to interference plus noise ratio parameter measured by user equipment in the unicast transmission mode, and channel quality of a base station in the multicast transmission mode, where user equipment coverage of the present base station in the multicast transmission mode exceeds a preset coverage threshold.

Figure 4:
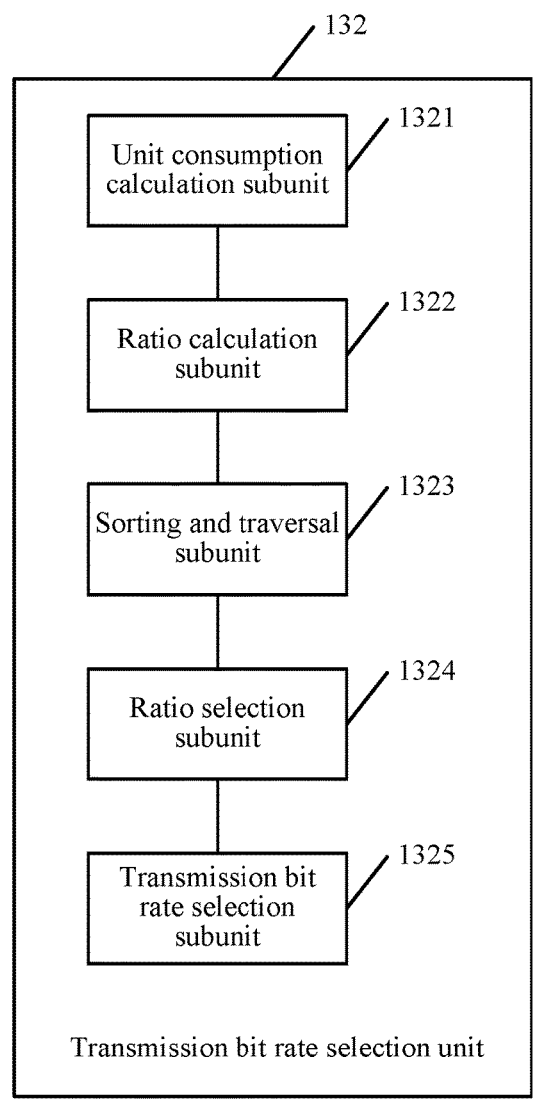
FIG. 4 is a schematic structural diagram of a transmission bit rate selection unit according to an embodiment of the present invention.

Further, referring to FIG. 4, FIG. 4 is a schematic structural diagram of a transmission bit rate selection unit 132 according to an embodiment of the present invention. The transmission bit rate selection unit 132 may include: a unit consumption calculation subunit 1321, a ratio calculation subunit 1322, a sorting and traversal subunit 1323, a ratio selection subunit 1324, and a transmission bit rate selection subunit 1325.

The unit consumption calculation subunit 1321 is configured to separately calculate, according to channel quality information and video bit rate class information that is included in video service information, a unit consumed resource that is of each piece of video data in a selected transmission mode and that is corresponding to each bit rate in the video bit rate class information, where the unit consumed resource is a resource consumed in each timeslot.

Specifically, a value of the unit consumed resource calculated by the unit consumption calculation subunit 1321 in the multicast transmission mode is equal to a ratio of each DASH bit rate corresponding to each piece of video data to a transmission rate that is of a unit resource block and that is corresponding to multicast channel quality, where the multicast channel quality is minimum multicast channel quality in the channel quality information. For a particular bit rate corresponding to particular video data, a value of the unit consumed resource calculated by the unit consumption calculation subunit 1321 in a unicast transmission mode is equal to a sum of a ratio of the bit rate to a transmission rate that is of a unit resource block and that is corresponding to unicast channel quality, where the unicast channel quality is channel quality, in the unicast transmission mode, of each user equipment that requests the video data.

The ratio calculation subunit 1322 is configured to separately calculate a calculation ratio of a peak signal to noise ratio of each piece of video data at each bit rate to a corresponding unit consumed resource.

Specifically, for a DASH bit rate of particular video data, the calculation ratio calculated by the ratio calculation subunit 1322 is a ratio of a sum of a PSNR peak signal to noise ratio of each user equipment at the DASH bit rate to a sum of a unit consumed resource corresponding to each user equipment.

The sorting and traversal subunit 1323 is configured to generate, according to the calculation ratio, a sorting result of each piece of video data that is corresponding to each bit rate, and traverse the sorting result in a descending order.

Specifically, the sorting and traversal subunit 1323 sorts, according to a value of the calculation ratio, each piece of video data corresponding to each bit rate, and sequentially traverses the sorting result according to the channel quality information. For example, there is video data A, B, and C with bit rate classes being 1, 2, and 3 respectively. A sorting result obtained by the sorting and traversal subunit 1323 according to the calculation ratio in a descending order may be A1, A2, B1, C1, A3, C2, C3, and B3.

The ratio selection subunit 1324 is configured to select, in a traversal procedure, a minimum calculation ratio that can meet a preset resource condition.

Specifically, the preset resource condition is that: a resource consumed in the multicast transmission mode is less than a first subframe quantity threshold, and total resources consumed in the multicast transmission mode and the unicast transmission mode are less than a second subframe quantity threshold. For example, the resource condition is that: total multicast RBs are within selected six subframes, and total RBs are within a range of one frame (10 subframes). The ratio selection subunit 1324 may select, in the traversal procedure, the minimum calculation ratio that can meet the preset resource condition. For example, there is video data A, B, and C with bit rate classes being 1, 2, and 3 respectively. A sorting result obtained by the sorting and traversal subunit 1323 according to the calculation ratio in a descending order may be A1, A2, B1, C1, A3, C2, C3, and B3. If C1 is the minimum calculation ratio that can meet the preset resource condition, A1, A2, B1, and C1 can all meet the preset resource condition.

The transmission bit rate selection subunit 1325 is configured to separately select, according to video data corresponding to a calculation ratio that is greater than or equal to the minimum calculation ratio that can meet the preset resource condition, a current maximum transmission bit rate corresponding to each piece of video data.

Specifically, the transmission bit rate selection subunit 1325 may separately select, according to the video data corresponding to the calculation ratio that is greater than or equal to the minimum calculation ratio that can meet the preset resource condition, the current maximum transmission bit rate corresponding to each piece of video data, where a calculation ratio corresponding to the current maximum transmission bit rate of each piece of video data is greater than or equal to the minimum calculation ratio that can meet the preset resource condition.

For example, there is video data A, B, and C with bit rate classes being 1, 2, and 3 respectively. A sorting result obtained according to the calculation ratio in a descending order may be A1, A2, B1, C1, A3, C2, C3, and B3. If the video data B corresponds to three user equipments, the video data A is transmitted by means of multicast, the video data B is transmitted by means of unicast, and the video data C is transmitted by means of multicast, when B1 meets the resource condition, the transmission bit rate selection subunit 1325 selects a transmission bit rate class of the video data A as 2. For the video data B, the transmission bit rate selection subunit 1325 may set a transmission bit rate class to 2 for all the user equipments corresponding to the video data B. Alternatively, the transmission bit rate selection subunit 1325 may first sort ratios of PSNRs that are corresponding to three bit rate classes of the three user equipments corresponding to the video data B to unit consumed resources in a descending order. Provided that the three user equipments are a, b, and c, a sorting result may be a1, b1, c1, a2, b2, c2, a3, b3, and c3. Then the transmission bit rate selection subunit 1325 traverses the sorting result. When detecting that b2 meets the resource condition and c2 cannot meet the resource condition, the transmission bit rate selection subunit 1325 may set a bit rate class of the user equipment a to 2, set a bit rate class of the user equipment b to 2, and set a bit rate class of the user equipment c to 1. If a case in which a resource cannot meet a requirement occurs until C2, because the video data C is transmitted by means of multicast, in this case, transmission bit rates of all user equipments of the video data C can be only class 1 transmission bit rates, transmission bit rates of all user equipments of the video data A may be class 3 transmission bit rates, and transmission bit rates of the user equipments of the video data B may be at least class 1 transmission bit rates.

All procedures executed by the unit consumption calculation subunit 1321, the ratio calculation subunit 1322, the sorting and traversal subunit 1323, the ratio selection subunit 1324, and the transmission bit rate selection subunit 1325 are executed based on a capacity maximization rule. A transmission bit rate is selected by using the capacity maximization rule, so that more users can obtain a high-quality video service.

It can be seen from the foregoing that, according to this embodiment of the present invention, decision information may be generated by collecting channel quality information and video service information of user equipment and based on a capacity maximization rule, so that a unicast service network element and a multicast service network element may control, according to the decision information, corresponding DASH video data to be transmitted by means of unicast and by means of multicast respectively. Therefore, a DASH service that supports a hybrid unicast and multicast transmission mode can better use a radio resource such as network bandwidth, and provide higher video quality for users, so as to meet various user requirements.

Figure 5:
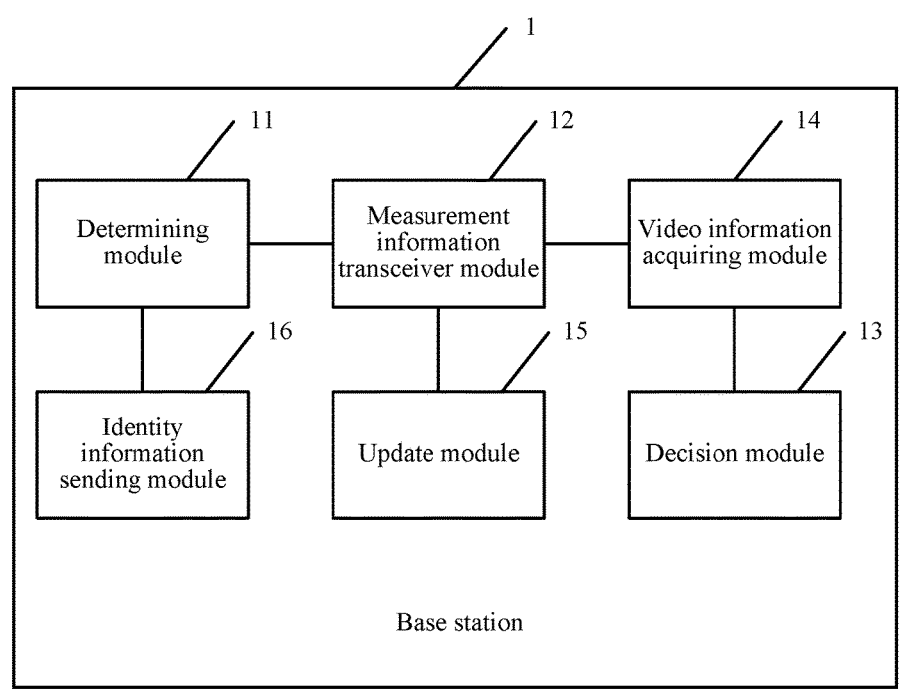
FIG. 5 is a schematic structural diagram of another base station according to an embodiment of the present invention.

Further referring to FIG. 5, FIG. 5 is a schematic structural diagram of another base station 1 according to an embodiment of the present invention. The base station 1 may include the determining module 11, the measurement information transceiver module 12, and the decision module 13 in the embodiment corresponding to FIG. 1. Further, the base station 1 may further include: a video information acquiring module 14, an update module 15, and an identity information sending module 16.

The video information acquiring module 14 is configured to acquire video service information from a transmission conversion apparatus by using a preset IP network-based interface.

Specifically, the video information acquiring module 14 may acquire the video service information from the transmission conversion apparatus by using the preset IP network-based interface, where the IP network-based interface is an interface configured to connect the base station and the transmission conversion apparatus. Because the transmission conversion apparatus is a newly added entity, there is no defined interface between the transmission conversion apparatus and the base station for performing communication.

Therefore, reference may be made to an existing interface between a multimedia broadcast multicast gateway and the base station, where the interface is a pure user-plane interface and is an IP network-based interface, so that an interface defined between the transmission conversion apparatus and the base station is the same as the interface defined between the multimedia broadcast multicast gateway and the base station.

The video service information includes an address of video data requested by user equipment and video bit rate class information corresponding to the address of the video data, where the bit rate class information includes at least one bit rate corresponding to the video data. The video information acquiring module 14 may collect the video service information in the transmission conversion apparatus. The transmission conversion apparatus acquires the video service information from a unicast service network element. When the unicast service network element forwards a media representation description that is returned by a DASH server to the user equipment, the unicast service network element intercepts and parses the media representation description, so as to acquire the video service information. For example, the transmission conversion apparatus may acquire an address url and video bit rate class information that are of video data that is requested by the user equipment and is sent by the unicast service network element, where the video bit rate class information includes 688 kbps, 1427 kbps, and 2056 kbps.

The update module 15 is configured to: when a measurement time interval reaches a measurement period included in measurement configuration information, receive updated channel quality information, and update decision information so as to update a transmission bit rate of the video data.

Specifically, when the measurement time interval of the update module 15 reaches the measurement period included in the measurement configuration information, the update module 15 may recollect channel quality information by using user equipment and a secondary base station that are corresponding to the present base station, so that the update module 15 may receive updated channel quality information and update the decision information according to the updated channel quality information. Therefore, an updated transmission bit rate may be obtained for the DASH video data at a next moment.

The identity information sending module 16 is configured to send primary base station identity information to the transmission conversion apparatus, so that the transmission conversion apparatus determines, according to the primary base station identity information, that the present base station is a primary base station.

Specifically, when the determining module 11 receives a selection result, the identity information sending module 16 may send the primary base station identity information to the transmission conversion apparatus, so that the transmission conversion apparatus may know, according to the primary base station identity information, which base station is the primary base station, and the transmission conversion apparatus may subsequently communicate with the primary base station.

It can be seen from the foregoing that, according to this embodiment of the present invention, decision information may be generated by collecting channel quality information and video service information of user equipment and based on a capacity maximization rule, so that a unicast service network element and a multicast service network element may control, according to the decision information, corresponding DASH video data to be transmitted by means of unicast and by means of multicast respectively. Therefore, a DASH service that supports a hybrid unicast and multicast transmission mode can better use a radio resource such as network bandwidth, and provide higher video quality for users, so as to meet various user requirements.

Figure 6:
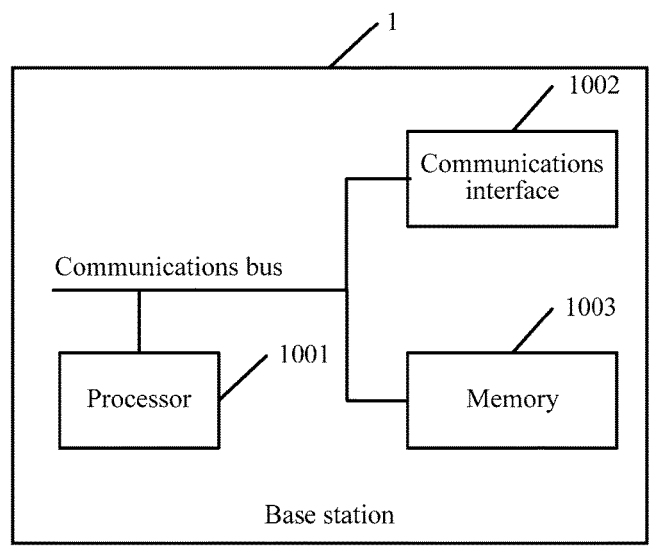
FIG. 6 is a schematic structural diagram of still another base station according to an embodiment of the present invention.

Further referring to FIG. 6, FIG. 6 is a schematic structural diagram of still another base station 1 according to an embodiment of the present invention. The base station 1 may include a processor 1001, a communications interface 1002, and a memory 1003. (There may be one or more processors 1001 in the base station 1, and an example in which there is one processor 1001 is used in FIG. 6.) In some embodiments of the present invention, the processor 1001, the communications interface 1002, and the memory 1003 may be connected by using a communications bus or in another manner. An example in which a connection is performed by using a communications bus is used in FIG. 6.

The communications interface 1002 is configured to communicate with a transmission conversion apparatus, a selection apparatus, user equipment, and a secondary base station.

The memory 1003 is configured to store a program.

The processor 1001 is configured to execute the program, so as to implement:

when receiving information about a selection result and measurement configuration information that is used to instruct the user equipment to perform a channel quality test, where the information about the selection result and the measurement configuration information are sent by the selection apparatus, determining, according to the selection result, that the present base station is a primary base station, where the selection result includes information about a primary base station and a secondary base station that are selected by the selection apparatus;

sending the measurement configuration information to user equipment and a secondary base station that are connected to the present base station, and receiving channel quality information that is of user equipment connected to the secondary base station and that is fed back, according to the measurement configuration information, by the user equipment and the secondary base station that are connected to the present base station; and generating decision information according to the channel quality information and video service information that is acquired from the transmission conversion apparatus, and sending the decision information to the transmission conversion apparatus, so that the transmission conversion apparatus instructs, according to the decision information, a unicast service network element to perform unicast transmission for video data and/or instructs, according to the decision information, a multicast service network element to perform multicast transmission for video data, where:

the decision information includes a transmission mode and a transmission bit rate of the video data.

The processor 1001 is further configured to:

acquire the video service information from the transmission conversion apparatus by using a preset IP network-based interface, where:

the video service information includes an address of the video data requested by the user equipment and video bit rate class information corresponding to the address of the video data, where the bit rate class information includes at least one bit rate corresponding to the video data; and the IP network-based interface is an interface configured to connect the base station and the transmission conversion apparatus.

The channel quality information of the user equipment connected to the secondary base station is obtained, by the user equipment connected to the secondary base station, by performing measurement according to the measurement configuration information sent by the secondary base station.

The processor 1001 is specifically configured to:
select the transmission mode of the video data according to the channel quality information and the video service information that is acquired from the transmission conversion apparatus;
select the transmission bit rate of the video data according to the channel quality information and the video service information that is acquired from the transmission conversion apparatus; and
send, to the transmission conversion apparatus, the decision information that carries the transmission mode of the video data and the transmission bit rate of the video data.

The processor 1001 is specifically configured to:
select, in the video bit rate class information included in the video service information and according to the channel quality information, a minimum bit rate that the video data can meet in both the unicast transmission and the multicast transmission as a reference bit rate;
calculate a first total resource consumed at the reference bit rate in a unicast transmission mode, and calculate a second total resource consumed at the reference bit rate in a multicast transmission mode; and
select, by comparing the first total resource with the second total resource, a transmission mode in which a minimum total resource is consumed as the transmission mode of the video data.

The processor 1001 is specifically configured to:
separately calculate, according to the channel quality information and the video bit rate class information that is included in the video service information, a unit consumed resource that is of each piece of video data in the selected transmission mode and that is corresponding to each bit rate in the video bit rate class information, where the unit consumed resource is a resource consumed in each timeslot;
separately calculate a calculation ratio of a peak signal to noise ratio of each piece of video data at each bit rate to a corresponding unit consumed resource;
generate, according to the calculation ratio, a sorting result of each piece of video data that is corresponding to each bit rate, and traverse the sorting result in a descending order;
select, in a traversal procedure, a minimum calculation ratio that can meet a preset resource condition; and
separately select, according to video data corresponding to a calculation ratio that is greater than or equal to the minimum calculation ratio that can meet the preset resource condition, a current maximum transmission bit rate corresponding to each piece of video data, where:
a calculation ratio corresponding to the current maximum transmission bit rate of each piece of video data is greater than or equal to the minimum calculation ratio that can meet the preset resource condition; and
the preset resource condition is that: a resource consumed in the multicast transmission mode is less than a first subframe quantity threshold, and total resources consumed in the multicast transmission mode and the unicast transmission mode are less than a second subframe quantity threshold.

The channel quality information includes a signal to interference plus noise ratio (SINR) parameter measured by the user equipment in the unicast transmission mode, and a signal to interference plus noise ratio parameter measured by the user equipment in the multicast transmission mode; or
the channel quality information includes a signal to interference plus noise ratio parameter measured by the user equipment in the unicast transmission mode, and channel quality of the present base station in the multicast transmission mode, where user equipment coverage of the present base station in the multicast transmission mode exceeds a preset coverage threshold.

The processor 1001 is further configured to:
when a measurement time interval reaches a measurement period included in the measurement configuration information, receive updated channel quality information, and update the decision information so as to update the transmission bit rate of the video data.

The processor 1001 is further configured to:
send primary base station identity information to the transmission conversion apparatus, so that the transmission conversion apparatus determines, according to the primary base station identity information, that the present base station is the primary base station.

It can be seen from the foregoing that, according to this embodiment of the present invention, decision information may be generated by collecting channel quality information and video service information of user equipment and based on a capacity maximization rule, so that a unicast service network element and a multicast service network element may control, according to the decision information, corresponding DASH video data to be transmitted by means of unicast and by means of multicast respectively. Therefore, a DASH service that supports a hybrid unicast and multicast transmission mode can better use a radio resource such as network bandwidth, and provide higher video quality for users, so as to meet various user requirements.

Figure 7:
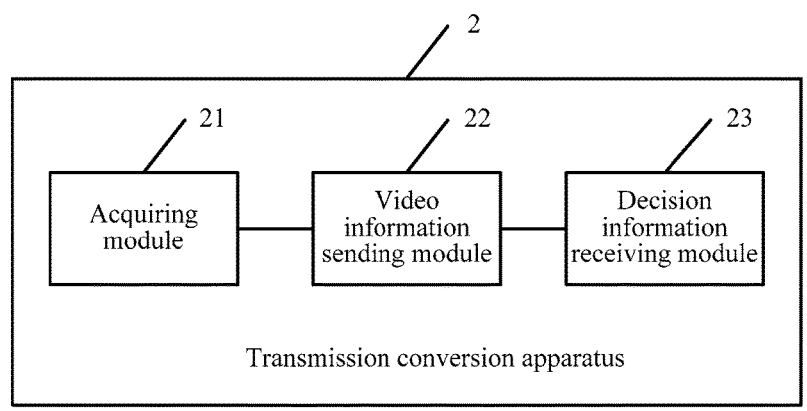
FIG. 7 is a schematic structural diagram of a transmission conversion apparatus according to an embodiment of the present invention.

Referring to FIG. 7, FIG. 7 is a schematic structural diagram of a transmission conversion apparatus 2 according to an embodiment of the present invention. The transmission conversion apparatus 2 may include: an acquiring module 21, a video information sending module 22, and a decision information receiving module 23.

The acquiring module 21 is configured to acquire video service information of a unicast service network element.

Specifically, the video service information includes an address of video data requested by user equipment and video bit rate class information corresponding to the address of the video data, where the bit rate class information includes at least one bit rate corresponding to the video data. The acquiring module 21 may acquire the video service information from the unicast service network element. When the unicast service network element forwards a media representation description that is returned by a DASH server to the user equipment, the unicast service network element may intercept and parse the media representation description, so as to acquire the video service information. For example, the transmission conversion apparatus 2 may acquire an address url and video bit rate class information that are of video data that is requested by the user equipment and is sent by the unicast service network element, where the video bit rate class information includes 688 kbps, 1427 kbps, and 2056 kbps.

The video information sending module 22 is configured to send the video service information to a base station, so that the base station generates decision information according to the video service information and acquired channel quality information of each user equipment, where the base station is a primary base station selected by a selection apparatus.

Specifically, the video information sending module 22 may send the video service information to the base station by using a preset IP network-based interface. The video service information includes the address of the video data requested by the user equipment and the video bit rate class information corresponding to the address of the video data, and the bit rate class information includes at least one bit rate corresponding to the video data. The IP network-based interface is an interface configured to connect the base station and the transmission conversion apparatus 2.

Because the transmission conversion apparatus 2 is a newly added entity, there is no defined interface between the transmission conversion apparatus 2 and the base station for performing communication. Therefore, reference may be made to an existing interface between a multimedia broadcast multicast gateway and the base station, where the interface is a pure user-plane interface and is an IP network-based interface, so that an interface defined between the transmission conversion apparatus 2 and the base station is the same as the interface defined between the multimedia broadcast multicast gateway and the base station.

After the video information sending module 22 sends the video service information to the base station, the base station may generate the decision information according to the video service information, the acquired channel quality information of each user equipment, and a capacity maximization rule. For a specific implementation procedure in which the base station generates the decision information, reference may be made to the embodiments corresponding to FIG. 1 to FIG. 6, and details are not described herein.

The decision information receiving module 23 is configured to receive the decision information sent by the base station, and separately send the decision information to the unicast service network element and a multicast service network element, so that the unicast service network element and the multicast service network element perform unicast transmission for the video data and perform multicast transmission for the video data respectively.

Specifically, after the base station generates the decision information, the decision information receiving module 23 may receive the decision information sent by the base station, and separately send the decision information to the unicast service network element and the multicast service network element, so that the unicast service network element and the multicast service network element perform the unicast transmission for the video data and perform the multicast transmission for the video data respectively. The decision information includes a transmission mode of the video data and a transmission bit rate of the video data. In this case, the unicast service network element may perform, at a current transmission bit rate, unicast transmission for the corresponding DASH video data according to the transmission mode and the transmission bit rate that are of the video data and that are included in the decision information; the multicast service network element may perform, at a current transmission bit rate, multicast transmission for the corresponding DASH video data according to the transmission mode and the transmission bit rate that are of the video data and that are included in the decision information. For example, video data requested by a small quantity of users may be transmitted in a unicast transmission mode; and video data requested by a large quantity of users at the same time may be transmitted in a multicast transmission mode, for example, may be transmitted in an MBSFN transmission mode. In this transmission mode, frequency resources can be reduced, and spectrum utilization can be increased, so that a DASH service can better use a radio resource such as network bandwidth.

The unicast service network element may be a DASH Proxy network element, and the multicast service network element may be a BM-SC network element. The transmission conversion apparatus 2 is a newly added control management entity configured to perform unicast and multicast conversion for a DASH service. The transmission conversion apparatus 2 may be disposed in an entity such as a DASH Proxy network element, a BM-SC network element, or a P-GW.

It can be seen from the foregoing that, according to this embodiment of the present invention, decision information may be generated by collecting channel quality information and video service information of user equipment and based on a capacity maximization rule, so that a unicast service network element and a multicast service network element may control, according to the decision information, corresponding DASH video data to be transmitted by means of unicast and by means of multicast respectively. Therefore, a DASH service that supports a hybrid unicast and multicast transmission mode can better use a radio resource such as network bandwidth, and provide higher video quality for users, so as to meet various user requirements.

Figure 8:
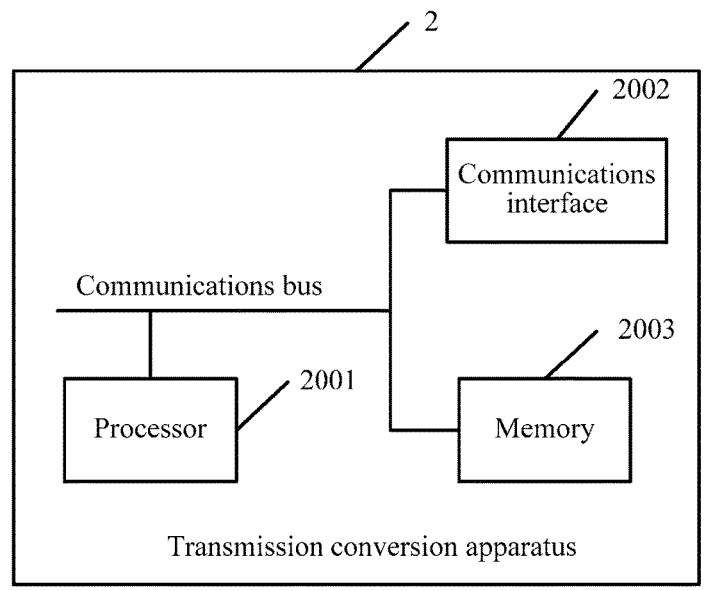
FIG. 8 is a schematic structural diagram of another transmission conversion apparatus according to an embodiment of the present invention.

Further referring to FIG. 8, FIG. 8 is a schematic structural diagram of another transmission conversion apparatus 2 according to an embodiment of the present invention. The transmission conversion apparatus 2 may include a processor 2001, a communications interface 2002, and a memory 2003. (There may be one or more processors 2001 in the transmission conversion apparatus 2, and an example in which there is one processor 2001 is used in FIG. 8.) In some embodiments of the present invention, the processor 2001, the communications interface 2002, and the memory 2003 may be connected by using a communications bus or in another manner. An example in which a connection is performed by using a communications bus is used in FIG. 8.

The communications interface 2002 is configured to communicate with a base station, a unicast service network element, and a multicast service network element.

The memory 2003 is configured to store a program.

The processor 2001 is configured to execute the program, so as to implement:

acquiring video service information of the unicast service network element;

sending the video service information to the base station, so that the base station generates decision information according to the video service information and acquired channel quality information of each user equipment, where the base station is a primary base station selected by a selection apparatus; and receiving the decision information sent by the base station, and separately sending the decision information to the unicast service network element and the multicast service network element, so that the unicast service network element and the multicast service network element perform unicast transmission for video data and perform multicast transmission for video data respectively.

The processor 2001 is specifically configured to:

send the video service information to the base station by using a preset IP network-based interface, where:

the video service information includes an address of the video data requested by the user equipment and video bit rate class information corresponding to the address of the video data, where the bit rate class information includes at least one bit rate corresponding to the video data; and the IP network-based interface is an interface configured to connect the base station and the transmission conversion apparatus 2.

The decision information includes a transmission mode of the video data and a transmission bit rate of the video data.

It can be seen from the foregoing that, according to this embodiment of the present invention, decision information may be generated by collecting channel quality information and video service information of user equipment and based on a capacity maximization rule, so that a unicast service network element and a multicast service network element may control, according to the decision information, corresponding DASH video data to be transmitted by means of unicast and by means of multicast respectively. Therefore, a DASH service that supports a hybrid unicast and multicast transmission mode can better use a radio resource such as network bandwidth, and provide higher video quality for users, so as to meet various user requirements.

Figure 9:
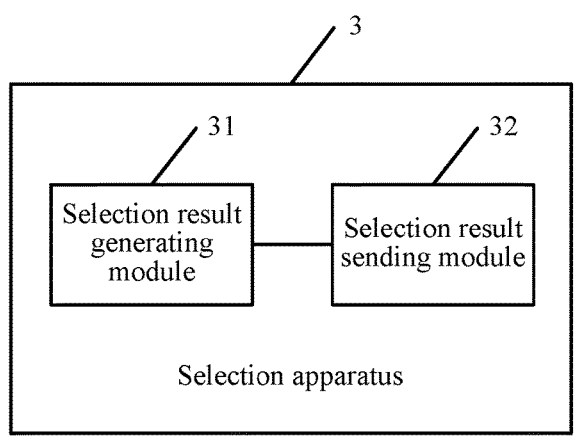
FIG. 9 is a schematic structural diagram of a selection apparatus according to an embodiment of the present invention.

Referring to FIG. 9, FIG. 9 is a schematic structural diagram of a selection apparatus 3 according to an embodiment of the present invention. The selection apparatus 3 may include a selection result generating module 31 and a selection result sending module 32.

The selection result generating module 31 is configured to select a primary base station and a secondary base station, and generate a selection result, where the selection result includes information about the primary base station and information about the secondary base station.

Specifically, the selection apparatus 3 may be an MME network element or an MCE network element. The selection result generating module 31 may select the primary base station and the secondary base station, and generate the selection result, where the selection result includes the information about the primary base station and the information about the secondary base station.

The selection result generating module 31 may include: a first selection unit, configured to randomly select a base station in a network as the primary base station, and use another base station in the network as the secondary base station; a second selection unit, configured to select, in a network, a base station that is connected to a largest quantity of user equipments as the primary base station, and use another base station in the network as the secondary base station; or a third selection unit, configured to select, in a network, a base station that provides best hardware performance as the primary base station, and use another base station in the network as the secondary base station.

The selection result sending module 32 is configured to send, to a base station, the selection result and measurement configuration information that is used to instruct user equipment to perform a channel quality test, so that the base station acquires channel quality information according to the selection result and the measurement configuration information, so as to generate decision information used to perform unicast transmission and/or multicast transmission for video data.

The selection result sending module 32 may further generate the measurement configuration information, where the measurement configuration information includes measurement parameters of unicast and multicast channel quality, or has a measurement parameter only of unicast channel quality; and the measurement configuration information may further include a measurement period. The selection result sending module 32 may send the selection result and the measurement configuration information to the base station, so that the base station acquires the channel quality information according to the selection result and the measurement configuration information, so as to generate the decision information used to perform the unicast transmission and/or the multicast transmission for the video data. The base station generates the decision information according to video service information acquired from a transmission conversion apparatus, acquired channel quality information of each user equipment, and a capacity maximization rule, and separately sends the decision information to a unicast service network element and a multicast service network element, so that the unicast service network element and the multicast service network element perform the unicast transmission for the video data and perform the multicast transmission for the video data respectively. The base station that receives the selection result is a base station corresponding to the information about the primary base station in the selection result. For a specific implementation procedure in which the base station generates the decision information, reference may be made to the embodiments corresponding to FIG. 1 to FIG. 6, and details are not described herein.

It can be seen from the foregoing that, according to this embodiment of the present invention, decision information may be generated by collecting channel quality information and video service information of user equipment and based on a capacity maximization rule, so that a unicast service network element and a multicast service network element may control, according to the decision information, corresponding DASH video data to be transmitted by means of unicast and by means of multicast respectively. Therefore, a DASH service that supports a hybrid unicast and multicast transmission mode can better use a radio resource such as network bandwidth, and provide higher video quality for users, so as to meet various user requirements.

Figure 10:
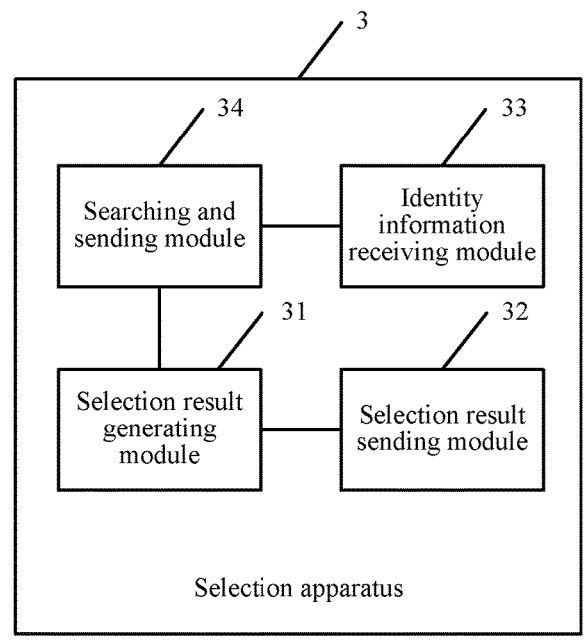
FIG. 10 is a schematic structural diagram of another selection apparatus according to an embodiment of the present invention.

Further referring to FIG. 10, FIG. 10 is a schematic structural diagram of another selection apparatus 3 according to an embodiment of the present invention. The selection apparatus 3 may include the selection result generating module 31 and the selection result sending module 32 in the embodiment corresponding to FIG. 9. Further, the selection apparatus 3 may further include an identity information receiving module 33 and a searching and sending module 34.

The identity information receiving module 33 is configured to receive identity information and an ECGI that are of user equipment corresponding to the present selection apparatus 3 and that are sent by a policy and charging rules function (PCRF) network element.

The searching and sending module 34 is configured to obtain, by searching according to the identity information and the ECGI of the user equipment, a base station corresponding to the user equipment, and send the identity information of the user equipment to the corresponding base station.

Specifically, before the selection result sending module 32 sends a selection result, the identity information receiving module 33 may receive the identity information and the ECGI that are of the user equipment corresponding to the present selection apparatus 3 and that are sent by the PCRF policy and charging rules function network element. The searching and sending module 34 obtains, by searching according to the identity information and the ECGI of the user equipment, the base station corresponding to the user equipment, and sends the identity information of the user equipment to the corresponding base station, so that when collecting channel quality information of the user equipment, each base station may instruct the user equipment that is indicated by the received identity information of the user equipment to perform measurement, where the identity information of the user equipment refers to identity information of user equipment that requests DASH video data.

The identity information and the ECGI of the user equipment are obtained by the PCRF policy and charging rules function network element by searching according to a user equipment network address sent by a unicast service network element.

Before the identity information receiving module 33 receives the identity information and the ECGI that are of the user equipment and that are sent by the PCRF network element, the unicast service network element may send known user equipment information to the PCRF network element, so that the PCRF network element may query, according to the user equipment information, for the identity information and the ECGI of the corresponding user equipment. The PCRF network element may obtain, by querying according to the identity information and the ECGI of the user equipment, the selection apparatus 3 to which the user equipment belongs, and send the identity information of the user equipment to the corresponding selection apparatus 3. The unicast service network element may be a DASH Proxy network element. For example, the DASH Proxy network element sends a user equipment network address to the PCRF network element. Then the PCRF network element queries for the identity information and the ECGI of the corresponding user equipment according to the user equipment network address; determines, according to the identity information and the ECGI of the corresponding user equipment, the MME network element to which the user equipment belongs; and sends the identity information and the ECGI of the corresponding user equipment to the MME network element by using a serving gateway. The identity information receiving module 33 in the MME network element determines, according to identity information of all base stations in a network, a base station corresponding to identity information of each user equipment, and sends the identity information of each user equipment to the base station corresponding to the user equipment.

It can be seen from the foregoing that, according to this embodiment of the present invention, decision information may be generated by collecting channel quality information and video service information of user equipment and based on a capacity maximization rule, so that a unicast service network element and a multicast service network element may control, according to the decision information, corresponding DASH video data to be transmitted by means of unicast and by means of multicast respectively. Therefore, a DASH service that supports a hybrid unicast and multicast transmission mode can better use a radio resource such as network bandwidth, and provide higher video quality for users, so as to meet various user requirements.

Figure 11:
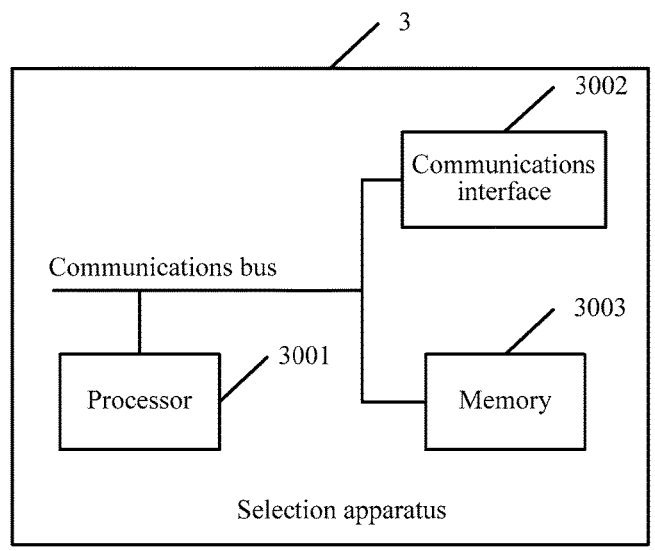
FIG. 11 is a schematic structural diagram of still another selection apparatus according to an embodiment of the present invention.

Further referring to FIG. 11, FIG. 11 is a schematic structural diagram of still another selection apparatus 3 according to an embodiment of the present invention. The selection apparatus 3 may include a processor 3001, a communications interface 3002, and a memory 3003. (There may be one or more processors 3001 in the selection apparatus 3, and an example in which there is one processor 3001 is used in FIG. 11.) In some embodiments of the present invention, the processor 3001, the communications interface 3002, and the memory 3003 may be connected by using a communications bus or in another manner. An example in which a connection is performed by using a communications bus is used in FIG. 11.

The communications interface 3002 is configured to communicate with a PCRF policy and charging rules function network element and a base station.

The memory 3003 is configured to store a program.

The processor 3001 is configured to execute the program, so as to implement:

selecting a primary base station and a secondary base station, and generating a selection result, where the selection result includes information about the primary base station and information about the secondary base station; and sending, to a base station, the selection result and measurement configuration information that is used to instruct user equipment to perform a channel quality test, so that the base station acquires channel quality information according to the selection result and the measurement configuration information, so as to generate decision information used to perform unicast transmission and/or multicast transmission for video data, where:

the base station generates the decision information according to the channel quality information and video service information that is acquired from a transmission conversion apparatus, and sends the generated decision information to the transmission conversion apparatus, so that the transmission conversion apparatus instructs, according to the decision information, a unicast service network element to perform the unicast transmission for the video data and/or instructs, according to the decision information, a multicast service network element to perform the multicast transmission for the video data; and the base station that receives the selection result is a base station corresponding to the information about the primary base station in the selection result.

The processor 3001 is specifically configured to:

randomly select a base station in a network as the primary base station, and use another base station in the network as the secondary base station; or select, in a network, a base station that is connected to a largest quantity of user equipments as the primary base station, and use another base station in the network as the secondary base station; or select, in a network, a base station that provides best hardware performance as the primary base station, and use another base station in the network as the secondary base station.

The processor 3001 is further configured to:

receive identity information and an ECGI that are of user equipment corresponding to the present selection apparatus 3 and that are sent by the PCRF policy and charging rules function network element; and obtain, by searching according to the identity information and the ECGI of the user equipment, a base station corresponding to the user equipment, and send the identity information of the user equipment to the corresponding base station, where:

the identity information and the ECGI of the user equipment are obtained by the PCRF policy and charging rules function network element by searching according to a user equipment network address sent by the unicast service network element.

It can be seen from the foregoing that, according to this embodiment of the present invention, decision information may be generated by collecting channel quality information and video service information of user equipment and based on a capacity maximization rule, so that a unicast service network element and a multicast service network element may control, according to the decision information, corresponding DASH video data to be transmitted by means of unicast and by means of multicast respectively. Therefore, a DASH service that supports a hybrid unicast and multicast transmission mode can better use a radio resource such as network bandwidth, and provide higher video quality for users, so as to meet various user requirements.

Figure 12:
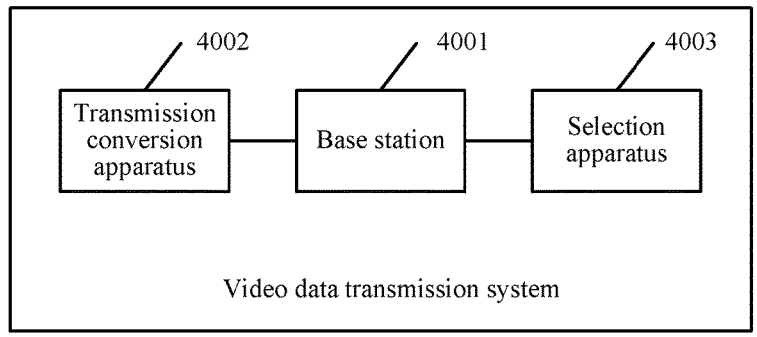
FIG. 12 is a schematic structural diagram of a video data transmission system according to an embodiment of the present invention.

Referring to FIG. 12, FIG. 12 is a schematic structural diagram of a video data transmission system according to an embodiment of the present invention. The system may include: a base station 4001, a transmission conversion apparatus 4002, and a selection apparatus 4003. The base station 4001, the transmission conversion apparatus 4002, and the selection apparatus 4003 may communicate with each other by using a wireless network. The base station 4001 is specifically the base station according to any one of the embodiments shown in FIG. 1 to FIG. 6. The transmission conversion apparatus 4002 is specifically the transmission conversion apparatus according to any one of the embodiments shown in FIG. 7 and FIG. 8. The selection apparatus 4003 is specifically the selection apparatus according to any one of the embodiments shown in FIG. 9 to FIG. 11.

It can be seen from the foregoing that, according to this embodiment of the present invention, decision information may be generated by collecting channel quality information and video service information of user equipment and based on a capacity maximization rule, so that a unicast service network element and a multicast service network element may control, according to the decision information, corresponding DASH video data to be transmitted by means of unicast and by means of multicast respectively. Therefore, a DASH service that supports a hybrid unicast and multicast transmission mode can better use a radio resource such as network bandwidth, and provide higher video quality for users, so as to meet various user requirements.

Figure 13:
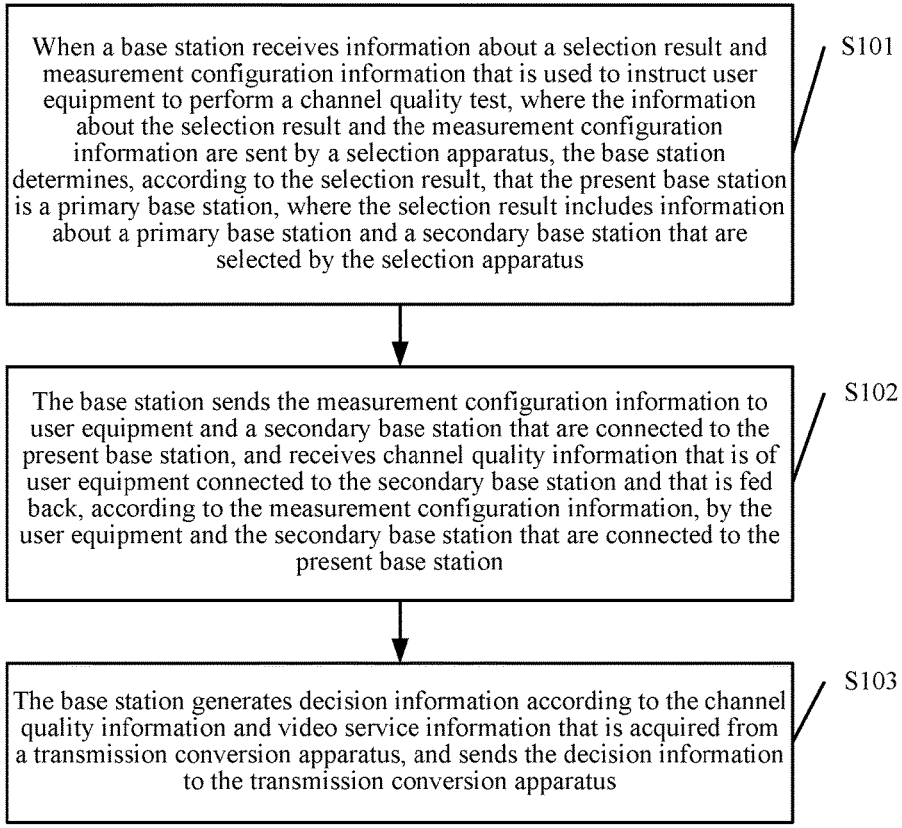
FIG. 13 is a schematic flowchart of a video data transmission method according to an embodiment of the present invention.

Referring to FIG. 13, FIG. 13 is a schematic flowchart of a video data transmission method according to an embodiment of the present invention. The method includes:

S101: When a base station receives information about a selection result and measurement configuration information that is used to instruct user equipment to perform a channel quality test, where the information about the selection result and the measurement configuration information are sent by a selection apparatus, the base station determines, according to the selection result, that the present base station is a primary base station, where the selection result includes information about a primary base station and a secondary base station that are selected by the selection apparatus.

Specifically, when the base station receives the information about the selection result and the measurement configuration information, where the information about the selection result and the measurement configuration information are sent by the selection apparatus, the base station determines, according to the selection result, that the present base station is the primary base station. In addition, the base station may further know that another base station in a network is the secondary base station. The selection result includes the information about the primary base station and the secondary base station that are selected by the selection apparatus according to a selection rule. The selection apparatus may be an MME network element or an MCE network element. The selection rule may be: randomly selecting a base station in the network as the primary base station, and using another base station in the network as the secondary base station; or selecting, in the network, a base station that is connected to a largest quantity of user equipments as the primary base station, and using another base station in the network as the secondary base station.

Before the selection apparatus sends the selection result, the selection apparatus may search, according to identity information and an ECGI that are of the user equipment and that are sent by a PCRF network element, for a base station corresponding to the user equipment, and send the identity information of the user equipment to the corresponding base station, so that when collecting channel quality information of the user equipment, each base station may instruct the user equipment that is indicated by the received identity information of the user equipment to perform measurement, where the identity information of the user equipment refers to identity information of user equipment that requests DASH video data.

Before the selection apparatus receives the identity information and the ECGI that are of the user equipment and that are sent by the PCRF network element, a unicast service network element may send known user equipment information to the PCRF network element, so that the PCRF network element may query, according to the user equipment information, for the identity information and the ECGI of the corresponding user equipment. The PCRF network element may obtain, by querying according to the identity information and the ECGI of the user equipment, the selection apparatus to which the user equipment belongs, and send the identity information of the user equipment to the corresponding selection apparatus. The unicast service network element may be a DASH Proxy network element. For example, the DASH Proxy network element sends a network address of the user equipment to the PCRF network element. Then the PCRF network element queries for the identity information and the ECGI of the corresponding user equipment according to the network address of the user equipment; determines, according to the identity information and the ECGI of the corresponding user equipment, the MME network element to which the user equipment belongs; and sends the identity information and the ECGI of the corresponding user equipment to the MME network element by using a serving gateway. The MME network element determines, according to identity information of all base stations in the network, a base station corresponding to identity information of each user equipment, and sends the identity information of each user equipment to the base station corresponding to the user equipment.

S102: The base station sends the measurement configuration information to user equipment and a secondary base station that are connected to the present base station, and receives channel quality information that is of user equipment connected to the secondary base station and that is fed back, according to the measurement configuration information, by the user equipment and the secondary base station that are connected to the present base station.

Specifically, the measurement configuration information may include a measurement parameter and a measurement period of the user equipment for channel quality. When the user equipment has a capability of measuring channel quality information in a multicast transmission mode, the measurement parameter of the user equipment for the channel quality may include a measurement parameter of channel quality in a unicast transmission mode and a measurement parameter of channel quality in the multicast transmission mode; or when the user equipment has no capability of measuring channel quality information in a multicast transmission mode, the measurement parameter of the user equipment for the channel quality may include a measurement parameter of channel quality in a unicast transmission mode.

The base station may send the measurement configuration information to the user equipment and the secondary base station that are connected to the present base station. When the user equipment connected to the present base station receives the measurement configuration information, the user equipment connected to the present base station may separately measure, according to the measurement configuration information, the channel quality in the unicast transmission mode and the channel quality in the multicast transmission mode; or measure the channel quality only in the unicast transmission mode. The user equipment connected to the present base station sends channel quality information obtained by measurement to the base station. When the secondary base station receives the measurement configuration information, the secondary base station may deliver the measurement configuration information to the user equipment connected to the secondary base station, and receive channel quality information uploaded by the user equipment connected to the secondary base station. The secondary base station then sends the uploaded channel quality information to the base station.

The channel quality information includes the channel quality information of the user equipment connected to the present base station and the channel quality information of the user equipment connected to the secondary base station. The channel quality information is an SINR measured by the user equipment in the unicast transmission mode, or an SINR signal to interference plus noise ratio parameter separately measured by the user equipment in the unicast transmission mode and in the multicast transmission mode.

The channel quality information of the user equipment connected to the secondary base station is obtained, by the user equipment connected to the secondary base station, by performing measurement according to the measurement configuration information sent by the secondary base station.

The base station is interconnected with and communicates with each secondary base station by using a Mesh.

S103: The base station generates decision information according to the channel quality information and video service information that is acquired from a transmission conversion apparatus, and sends the decision information to the transmission conversion apparatus.

Specifically, the base station generates the decision information according to the channel quality information and the video service information that is acquired from the transmission conversion apparatus, and sends the decision information to the transmission conversion apparatus. The decision information includes a transmission mode and a transmission bit rate of video data. The transmission conversion apparatus may send the decision information to the unicast service network element and a multicast service network element. In this case, the unicast service network element may perform, at a current transmission bit rate, unicast transmission for the corresponding DASH video data according to the transmission mode and the transmission bit rate that are of the video data and that are included in the decision information; the multicast service network element may perform, at a current transmission bit rate, multicast transmission for the corresponding DASH video data according to the transmission mode and the transmission bit rate that are of the video data and that are included in the decision information. For example, video data requested by a small quantity of users may be transmitted in the unicast transmission mode; and video data requested by a large quantity of users at the same time may be transmitted in the multicast transmission mode, for example, may be transmitted in an MBSFN transmission mode. In this transmission mode, frequency resources can be reduced, and spectrum utilization can be increased, so that a DASH service can better use a radio resource such as network bandwidth.

The base station determines the transmission bit rate according to a capacity maximization rule. The capacity maximization rule refers to: within a particular network resource, making a quantity of users who can obtain a video service reach a maximum value that can be supported by the current network resource, and in addition, making quality of the video service obtained by the users reach a maximum value that can be supported by the current network resource. The capacity maximization rule may be set according to a size of a total consumed resource and a video quality PSNR. That is, the capacity maximization rule may enable a consideration of balancing between a quantity of users who obtain a video service and video service quality, so that both the user quantity and the video service quality reach a maximum value. A transmission bit rate may be selected according to the capacity maximization rule, so that more users can obtain a high-quality video service.

The multicast service network element may be a BM-SC network element. The transmission conversion apparatus is a newly added control management entity configured to perform unicast and multicast conversion for a DASH service. The transmission conversion apparatus may be disposed in an entity such as a DASH Proxy network element, a BM-SC network element, or a P-GW. Because the transmission conversion apparatus is a newly added entity, there is no defined interface between the transmission conversion apparatus and the base station for performing communication. Therefore, reference may be made to an existing interface between a multimedia broadcast multicast gateway and the base station, where the interface is a pure user-plane interface and is an IP network-based interface, so that an interface defined between the transmission conversion apparatus and the base station is the same as the interface defined between the multimedia broadcast multicast gateway and the base station.

The video service information includes an address of the video data requested by the user equipment and video bit rate class information corresponding to the address of the video data, where the bit rate class information includes at least one bit rate corresponding to the video data. The base station may collect the video service information in the transmission conversion apparatus. The transmission conversion apparatus acquires the video service information from the unicast service network element. When the unicast service network element forwards a media representation description that is returned by a DASH server to the user equipment, the unicast service network element intercepts and parses the media representation description, so as to acquire the video service information. For example, the transmission conversion apparatus may acquire an address url and video bit rate class information that are of video data that is requested by the user equipment and is sent by the unicast service network element, where the video bit rate class information includes 688 kbps, 1427 kbps, and 2056 kbps.

When the user equipment can measure unicast and multicast channel quality, the base station may generate the decision information according to the capacity maximization rule, the channel quality information, and the video service information that is acquired from the transmission conversion apparatus. When the user equipment can measure only unicast channel quality, the base station may generate the decision information according to the capacity maximization rule, the channel quality information, channel quality of the present base station in the multicast transmission mode, and the video service information that is acquired from the transmission conversion apparatus. In this case, user equipment coverage of the base station in the multicast transmission mode exceeds a preset coverage threshold. For example, the base station uses, as a reference multicast signal to noise ratio, channel quality at which 95% of user equipments that perform transmission in the multicast transmission mode are covered.

It can be seen from the foregoing that, according to this embodiment of the present invention, decision information may be generated by collecting channel quality information and video service information of user equipment and based on a capacity maximization rule, so that a unicast service network element and a multicast service network element may control, according to the decision information, corresponding DASH video data to be transmitted by means of unicast and by means of multicast respectively. Therefore, a DASH service that supports a hybrid unicast and multicast transmission mode can better use a radio resource such as network bandwidth, and provide higher video quality for users, so as to meet various user requirements.

Figure 14:
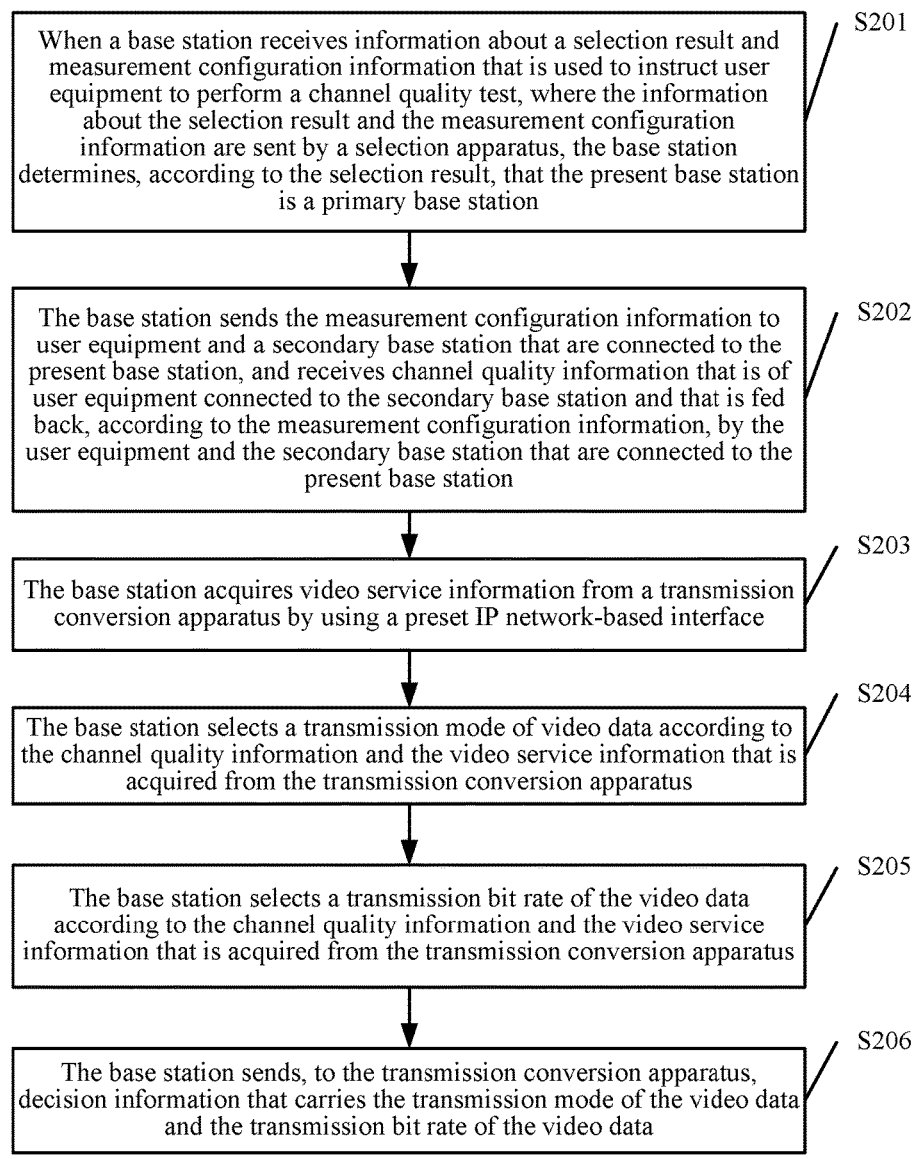
FIG. 14 is a schematic flowchart of another video data transmission method according to an embodiment of the present invention.

Further referring to FIG. 14, FIG. 14 is a schematic flowchart of another video data transmission method according to an embodiment of the present invention. The method includes:

S201: When a base station receives information about a selection result and measurement configuration information that is used to instruct user equipment to perform a channel quality test, where the information about the selection result and the measurement configuration information are sent by a selection apparatus, the base station determines, according to the selection result, that the present base station is a primary base station.

Specifically, when the base station receives the information about the selection result and the measurement configuration information, where the information about the selection result and the measurement configuration information are sent by the selection apparatus, the base station determines, according to the selection result, that the present base station is the primary base station. In addition, the base station may further know that another base station in a network is a secondary base station. The selection result includes information about the primary base station and the secondary base station that are selected by the selection apparatus according to a selection rule. The selection apparatus may be an MME network element or an MCE network element. The selection rule may be: randomly selecting a base station in the network as the primary base station, and using another base station in the network as the secondary base station; or selecting, in the network, a base station that is connected to a largest quantity of user equipments as the primary base station, and using another base station in the network as the secondary base station.

Before the selection apparatus sends the selection result, the selection apparatus may search, according to identity information and an ECGI that are of the user equipment and that are sent by a PCRF network element, for a base station corresponding to the user equipment, and send the identity information of the user equipment to the corresponding base station, so that when collecting channel quality information of the user equipment, each base station may instruct the user equipment that is indicated by the received identity information of the user equipment to perform measurement, where the identity information of the user equipment refers to identity information of user equipment that requests DASH video data.

Before the selection apparatus receives the identity information and the ECGI that are of the user equipment and that are sent by the PCRF network element, a unicast service network element may send known user equipment information to the PCRF network element, so that the PCRF network element may query, according to the user equipment information, for the identity information and the ECGI of the corresponding user equipment. The PCRF network element may obtain, by querying according to the identity information and the ECGI of the user equipment, the selection apparatus to which the user equipment belongs, and send the identity information of the user equipment to the corresponding selection apparatus. The unicast service network element may be a DASH Proxy network element. For example, the DASH Proxy network element sends a network address of the user equipment to the PCRF network element. Then the PCRF network element queries for the identity information and the ECGI of the corresponding user equipment according to the network address of the user equipment; determines, according to the identity information and the ECGI of the corresponding user equipment, the MME network element to which the user equipment belongs; and sends the identity information and the ECGI of the corresponding user equipment to the MME network element by using a serving gateway. The MME network element determines, according to identity information of all base stations in the network, a base station corresponding to identity information of each user equipment, and sends the identity information of each user equipment to the base station corresponding to the user equipment.

S202: The base station sends the measurement configuration information to user equipment and a secondary base station that are connected to the present base station, and receives channel quality information that is of user equipment connected to the secondary base station and that is fed back, according to the measurement configuration information, by the user equipment and the secondary base station that are connected to the present base station.

Specifically, the measurement configuration information may include a measurement parameter and a measurement period of the user equipment for channel quality. When the user equipment has a capability of measuring channel quality information in a multicast transmission mode, the measurement parameter of the user equipment for the channel quality may include a measurement parameter of channel quality in a unicast transmission mode and a measurement parameter of channel quality in the multicast transmission mode; or when the user equipment has no capability of measuring channel quality information in a multicast transmission mode, the measurement parameter of the user equipment for the channel quality may include a measurement parameter of channel quality in a unicast transmission mode.

The base station may send the measurement configuration information to the user equipment and the secondary base station that are connected to the present base station. When the user equipment connected to the present base station receives the measurement configuration information, the user equipment connected to the present base station may separately measure, according to the measurement configuration information, the channel quality in the unicast transmission mode and the channel quality in the multicast transmission mode; or measure the channel quality only in the unicast transmission mode. The user equipment connected to the present base station sends channel quality information obtained by measurement to the base station. When the secondary base station receives the measurement configuration information, the secondary base station may deliver the measurement configuration information to the user equipment connected to the secondary base station, and receive channel quality information uploaded by the user equipment connected to the secondary base station. The secondary base station then sends the uploaded channel quality information to the base station.

The channel quality information includes the channel quality information of the user equipment connected to the present base station and the channel quality information of the user equipment connected to the secondary base station. The channel quality information is an SINR signal to interference plus noise ratio parameter measured by the user equipment in the unicast transmission mode, or an SINR signal to interference plus noise ratio parameter separately measured by the user equipment in the unicast transmission mode and in the multicast transmission mode.

The channel quality information of the user equipment connected to the secondary base station is obtained, by the user equipment connected to the secondary base station, by performing measurement according to the measurement configuration information sent by the secondary base station.

S203: The base station acquires video service information from a transmission conversion apparatus by using a preset IP network-based interface.

Specifically, the base station may acquire the video service information from the transmission conversion apparatus by using the preset IP network-based interface, where the IP network-based interface is an interface configured to connect the base station and the transmission conversion apparatus. Because the transmission conversion apparatus is a newly added entity, there is no defined interface between the transmission conversion apparatus and the base station for performing communication. Therefore, reference may be made to an existing interface between a multimedia broadcast multicast gateway and the base station, where the interface is a pure user-plane interface and is an IP network-based interface, so that an interface defined between the transmission conversion apparatus and the base station is the same as the interface defined between the multimedia broadcast multicast gateway and the base station.

The video service information includes an address of video data requested by the user equipment and video bit rate class information corresponding to the address of the video data, where the bit rate class information includes at least one bit rate corresponding to the video data. The base station may collect the video service information in the transmission conversion apparatus. The transmission conversion apparatus acquires the video service information from the unicast service network element. When the unicast service network element forwards a media representation description that is returned by a DASH server to the user equipment, the unicast service network element intercepts and parses the media representation description, so as to acquire the video service information. For example, the transmission conversion apparatus may acquire an address url and video bit rate class information that are of video data that is requested by the user equipment and is sent by the unicast service network element, where the video bit rate class information includes 688 kbps, 1427 kbps, and 2056 kbps.

S204: The base station selects a transmission mode of video data according to the channel quality information and the video service information that is acquired from the transmission conversion apparatus.

Specifically, the base station may select the transmission mode of the video data according to the channel quality information and the video service information that is acquired from the transmission conversion apparatus. The base station may separately calculate, according to the channel quality information, a total resource consumed by the video data in the unicast transmission mode and a total resource consumed by the video data in the multicast transmission mode. The base station selects a transmission mode in which a smaller total resource is consumed as the transmission mode of the video data.

S205: The base station selects a transmission bit rate of the video data according to the channel quality information and the video service information that is acquired from the transmission conversion apparatus.

Specifically, after the base station selects the corresponding transmission mode, the base station may select the transmission bit rate of the video data according to a capacity maximization rule, the channel quality information, and the video service information that is acquired from the transmission conversion apparatus. Firstly, the base station may separately calculate, according to the channel quality information, a unit consumed resource that is of each piece of video data in the selected transmission mode and that is corresponding to each bit rate in the video bit rate class information. Then, the base station may select, according to a video quality PSNR corresponding to each DASH bit rate in each piece of video data and according to the corresponding consumed unit consumed resource, a transmission bit rate of a transmission mode corresponding to each piece of video data. An objective of selecting a transmission bit rate by the base station is to preferentially serve, as much as possible, a service or user that brings about a higher RSNR on each RB.

S206: The base station sends, to the transmission conversion apparatus, decision information that carries the transmission mode of the video data and the transmission bit rate of the video data.

After the base station selects the corresponding transmission mode and the corresponding transmission bit rate, the base station may send, to the transmission conversion apparatus, the decision information that carries the transmission mode of the video data and the transmission bit rate of the video data, so that the transmission conversion apparatus may send the decision information to the unicast service network element and a multicast service network element. In this case, the unicast service network element may perform, at a current transmission bit rate, unicast transmission for the corresponding DASH video data according to the transmission mode and the transmission bit rate that are of the video data and that are included in the decision information; the multicast service network element may perform, at a current transmission bit rate, multicast transmission for the corresponding DASH video data according to the transmission mode and the transmission bit rate that are of the video data and that are included in the decision information. For example, video data requested by a small quantity of users may be transmitted in the unicast transmission mode; and video data requested by a large quantity of users at the same time may be transmitted in the multicast transmission mode, for example, may be transmitted in an MBSFN transmission mode. In this transmission mode, frequency resources can be reduced, and spectrum utilization can be increased, so that a DASH service can better use a radio resource such as network bandwidth.

The channel quality information may include a signal to interference plus noise ratio parameter measured by the user equipment in the unicast transmission mode, and a signal to interference plus noise ratio parameter measured by the user equipment in the multicast transmission mode; or when the user equipment can measure channel quality only of unicast transmission, the channel quality information may include a signal to interference plus noise ratio parameter measured by the user equipment in the unicast transmission mode, and channel quality of the present base station in the multicast transmission mode, where user equipment coverage of the present base station in the multicast transmission mode exceeds a preset coverage threshold.

When a measurement time interval reaches the measurement period included in the measurement configuration information, the base station provided in this embodiment of the present invention may further receive updated channel quality information, and update the decision information so as to update the transmission bit rate of the video data.

Specifically, when the measurement time interval of the base station reaches the measurement period included in the measurement configuration information, the base station may recollect channel quality information by using the user equipment and the secondary base station that are corresponding to the present base station, so that the base station may receive updated channel quality information, and update the decision information according to the updated channel quality information. Therefore, an updated transmission bit rate may be obtained for the DASH video data at a next moment.

The base station provided in this embodiment of the present invention may further send primary base station identity information to the transmission conversion apparatus, so that the transmission conversion apparatus determines, according to the primary base station identity information, that the present base station is the primary base station.

Specifically, when the base station receives the selection result, the base station may send the primary base station identity information to the transmission conversion apparatus, so that the transmission conversion apparatus may know, according to the primary base station identity information, which base station is the primary base station, and the transmission conversion apparatus may subsequently communicate with the primary base station.

It can be seen from the foregoing that, according to this embodiment of the present invention, decision information may be generated by collecting channel quality information and video service information of user equipment and based on a capacity maximization rule, so that a unicast service network element and a multicast service network element may control, according to the decision information, corresponding DASH video data to be transmitted by means of unicast and by means of multicast respectively. Therefore, a DASH service that supports a hybrid unicast and multicast transmission mode can better use a radio resource such as network bandwidth, and provide higher video quality for users, so as to meet various user requirements.

Figure 15:
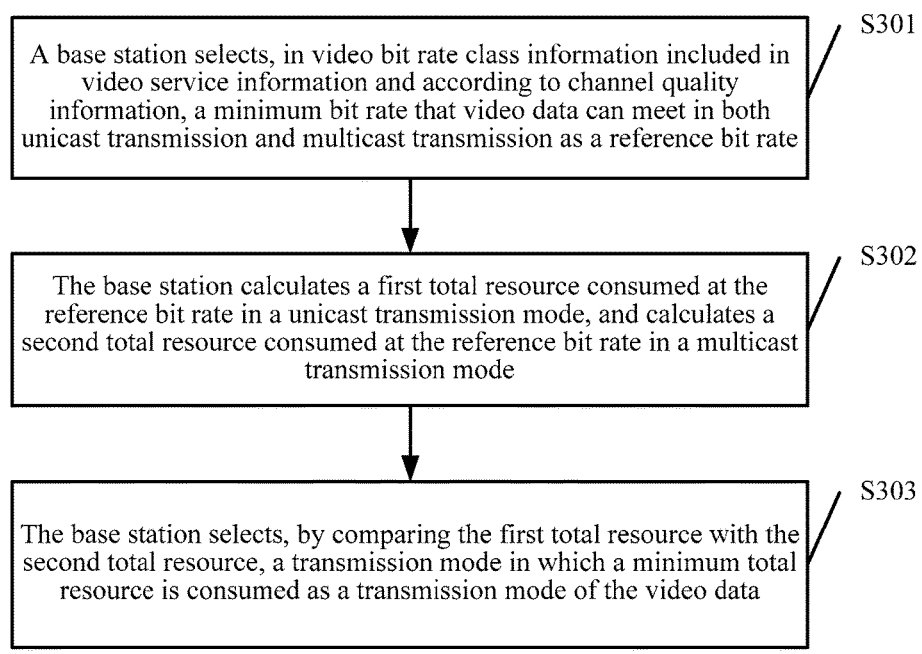
FIG. 15 is a schematic flowchart of a transmission mode selection method according to an embodiment of the present invention.

Further, referring to FIG. 15, FIG. 15 is a schematic flowchart of a transmission mode selection method according to an embodiment of the present invention. The method in this embodiment of the present invention may be corresponding to S204 in the embodiment corresponding to FIG. 14. Transmission mode selection is used for description in this embodiment of the present invention. The method in this embodiment of the present invention specifically includes:

S301: A base station selects, in video bit rate class information included in video service information and according to channel quality information, a minimum bit rate that video data can meet in both unicast transmission and multicast transmission as a reference bit rate.

Specifically, the base station may select, in the video bit rate class information included in the video service information and according to the channel quality information, the minimum bit rate that the video data can meet in both the unicast transmission and the multicast transmission as the reference bit rate. For example, for particular video data, video bit rate class information corresponding to the video data includes three bit rate classes, that is, class 1, class 2, and class 3. If a class 1 bit rate is a minimum bit rate that the video data can meet in both the unicast transmission and the multicast transmission, the class 1 bit rate is used as a reference bit rate.

S302: The base station calculates a first total resource consumed at the reference bit rate in a unicast transmission mode, and calculates a second total resource consumed at the reference bit rate in a multicast transmission mode.

For particular video data, the base station may calculate a first total resource consumed at the reference bit rate in the unicast transmission mode, and calculate a second total resource consumed at the reference bit rate in the multicast transmission mode.

S303: The base station selects, by comparing the first total resource with the second total resource, a transmission mode in which a minimum total resource is consumed as a transmission mode of the video data.

When the base station learns, by comparison, that a first total resource consumed by particular video data at the reference bit rate in the unicast transmission mode is less than a second total resource consumed by the video data at the reference bit rate in the multicast transmission mode, the base station selects the unicast transmission mode to transmit the video data; when the base station learns, by comparison, that a first total resource consumed by particular video data at the reference bit rate in the unicast transmission mode is greater than a second total resource consumed by the video data at the reference bit rate in the multicast transmission mode, the base station selects the multicast transmission mode to transmit the video data.

The channel quality information may include a signal to interference plus noise ratio parameter measured by user equipment in the unicast transmission mode, and a signal to interference plus noise ratio parameter measured by the user equipment in the multicast transmission mode; or the channel quality information includes a signal to interference plus noise ratio parameter measured by user equipment in the unicast transmission mode, and channel quality of the present base station in the multicast transmission mode, where user equipment coverage of the present base station in the multicast transmission mode exceeds a preset coverage threshold.

In this embodiment of the present invention, a transmission mode of video data may be selected by using channel quality information, so that hybrid unicast and multicast transmission may be flexibly performed for a DASH service.

Figure 16:
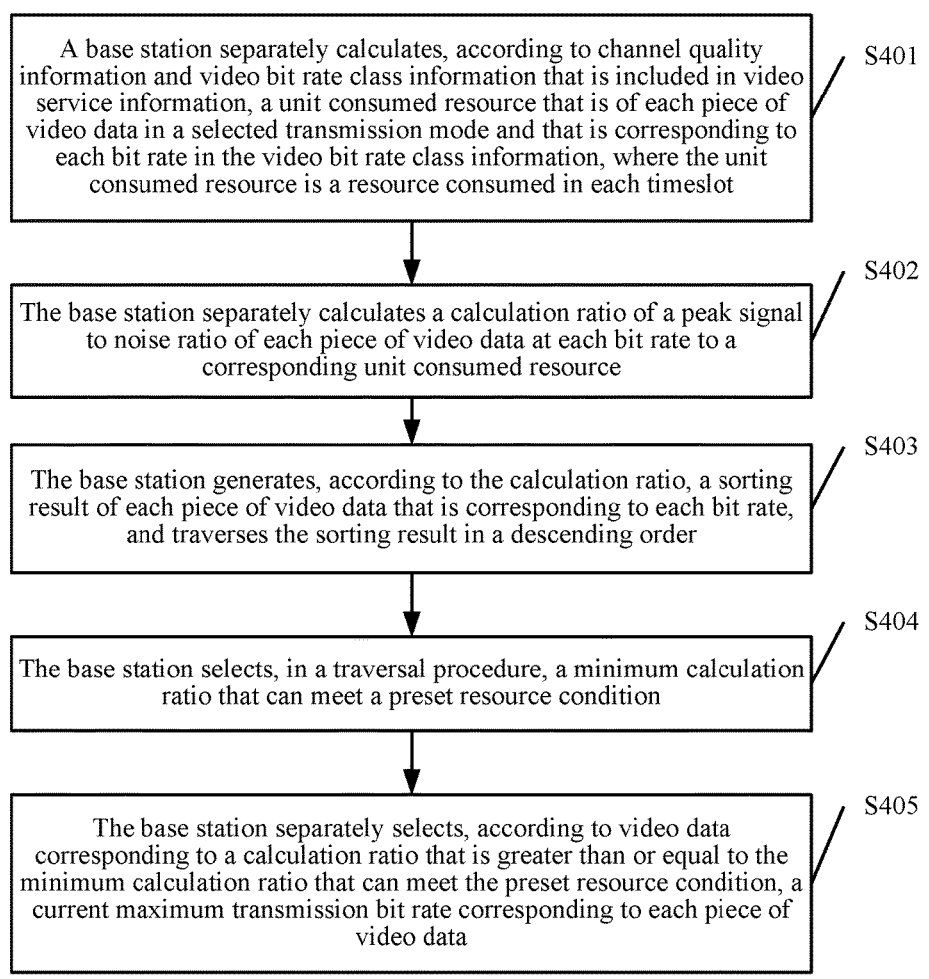
FIG. 16 is a schematic flowchart of a transmission bit rate selection method according to an embodiment of the present invention.

Further, referring to FIG. 16, FIG. 16 is a schematic flowchart of a transmission bit rate selection method according to an embodiment of the present invention. The method in this embodiment of the present invention may be corresponding to S205 in the embodiment corresponding to FIG. 14. Transmission bit rate selection is used for description in this embodiment of the present invention. The method in this embodiment of the present invention specifically includes:

S401: The base station separately calculates, according to the channel quality information and the video bit rate class information that is included in the video service information, a unit consumed resource that is of each piece of video data in a selected transmission mode and that is corresponding to each bit rate in the video bit rate class information, where the unit consumed resource is a resource consumed in each timeslot.

Specifically, a value of the unit consumed resource calculated by the base station in a multicast transmission mode is equal to a ratio of each DASH bit rate corresponding to each piece of video data to a transmission rate that is of a unit resource block and that is corresponding to multicast channel quality, where the multicast channel quality is minimum multicast channel quality in the channel quality information. For a particular bit rate corresponding to particular video data, a value of the unit consumed resource calculated by the base station in a unicast transmission mode is equal to a sum of a ratio of the bit rate to a transmission rate that is of a unit resource block and that is corresponding to each type of unicast channel quality, where the unicast channel quality is channel quality, in the unicast transmission mode, of each user equipment that requests the video data.

S402: The base station separately calculates a calculation ratio of a peak signal to noise ratio of each piece of video data at each bit rate to a corresponding unit consumed resource.

Specifically, for a DASH bit rate of particular video data, the calculation ratio calculated by the base station is a ratio of a sum of a PSNR peak signal to noise ratio of each user equipment at the DASH bit rate to a sum of a unit consumed resource corresponding to each user equipment.

S403: The base station generates, according to the calculation ratio, a sorting result of each piece of video data that is corresponding to each bit rate, and traverses the sorting result in a descending order.

Specifically, the base station sorts, according to a value of the calculation ratio, each piece of video data corresponding to each bit rate, and sequentially traverses the sorting result according to the channel quality information. For example, there is video data A, B, and C with bit rate classes being 1, 2, and 3 respectively. A sorting result obtained by the base station according to the calculation ratio in a descending order may be A1, A2, B1, C1, A3, C2, C3, and B3.

S404: The base station selects, in a traversal procedure, a minimum calculation ratio that can meet a preset resource condition.

Specifically, the preset resource condition is that: a resource consumed in the multicast transmission mode is less than a first subframe quantity threshold, and total resources consumed in the multicast transmission mode and the unicast transmission mode are less than a second subframe quantity threshold. For example, the resource condition is that: total multicast RBs are within selected six subframes, and total RBs are within a range of one frame (10 subframes). The base station may select, in the traversal procedure, the minimum calculation ratio that can meet the preset resource condition. For example, there is video data A, B, and C with bit rate classes being 1, 2, and 3 respectively. A sorting result obtained by the base station according to the calculation ratio in a descending order may be A1, A2, B1, C1, A3, C2, C3, and B3. If C1 is the minimum calculation ratio that can meet the preset resource condition, A1, A2, B1, and C1 can all meet the preset resource condition.

S405: The base station separately selects, according to video data corresponding to a calculation ratio that is greater than or equal to the minimum calculation ratio that can meet the preset resource condition, a current maximum transmission bit rate corresponding to each piece of video data.

Specifically, the base station may separately select, according to the video data corresponding to the calculation ratio that is greater than or equal to the minimum calculation ratio that can meet the preset resource condition, the current maximum transmission bit rate corresponding to each piece of video data, where a calculation ratio corresponding to the current maximum transmission bit rate of each piece of video data is greater than or equal to the minimum calculation ratio that can meet the preset resource condition.

For example, there is video data A, B, and C with bit rate classes being 1, 2, and 3 respectively. A sorting result obtained according to the calculation ratio in a descending order may be A1, A2, B1, C1, A3, C2, C3, and B3. If the video data B corresponds to three user equipments, the video data A is transmitted by means of multicast, the video data B is transmitted by means of unicast, and the video data C is transmitted by means of multicast, when B1 meets the resource condition, the base station selects a transmission bit rate class of the video data A as 2. For the video data B, the base station may set a transmission bit rate class to 2 for all the user equipments corresponding to the video data B. Alternatively, the base station may first sort ratios of PSNRs that are corresponding to three bit rate classes of the three user equipments corresponding to the video data B to unit consumed resources in a descending order. Provided that the three user equipments are a, b, and c, a sorting result may be a1, b1, c1, a2, b2, c2, a3, b3, and c3. Then the base station traverses the sorting result. When detecting that b2 meets the resource condition and c2 cannot meet the resource condition, the base station may set a bit rate class of the user equipment a to 2, set a bit rate class of the user equipment b to 2, and set a bit rate class of the user equipment c to 1. If a case in which a resource cannot meet a requirement occurs until C2, because the video data C is transmitted by means of multicast, in this case, transmission bit rates of all user equipments of the video data C can be only class 1 transmission bit rates, transmission bit rates of all user equipments of the video data A may be class 3 transmission bit rates, and transmission bit rates of the user equipments of the video data B may be at least class 1 transmission bit rates.

All steps executed in S401 to S405 are executed based on a capacity maximization rule. A transmission bit rate is selected by using the capacity maximization rule, so that more users can obtain a high-quality video service.

In this embodiment of the present invention, a transmission bit rate of a transmission mode corresponding to each piece of video data may be selected by using channel quality information, so that a DASH service can better use a radio resource such as network bandwidth.

In this embodiment of the present invention, a transmission bit rate of a transmission mode corresponding to each piece of video data may be selected by using channel quality information that includes channel quality in a unicast transmission mode and by using channel quality of a base station in a multicast transmission mode, so that when user equipment cannot collect multicast channel quality, a DASH service can still well use a radio resource such as network bandwidth.

Figure 17:
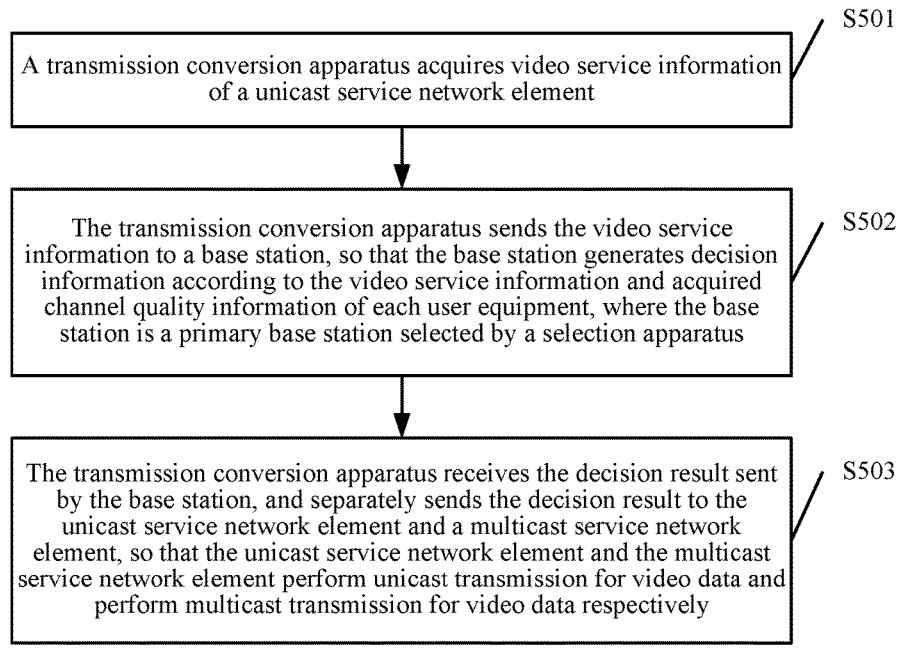
FIG. 17 is a schematic flowchart of still another video data transmission method according to an embodiment of the present invention.

Further referring to FIG. 17, FIG. 17 is a schematic flowchart of still another video data transmission method according to an embodiment of the present invention. The method includes:

S501: A transmission conversion apparatus acquires video service information of a unicast service network element.

Specifically, the video service information includes an address of video data requested by user equipment and video bit rate class information corresponding to the address of the video data, where the bit rate class information includes at least one bit rate corresponding to the video data. The transmission conversion apparatus may acquire the video service information from the unicast service network element. When the unicast service network element forwards a media representation description that is returned by a DASH server to the user equipment, the unicast service network element may intercept and parse the media representation description, so as to acquire the video service information. For example, the transmission conversion apparatus may acquire an address url and video bit rate class information that are of video data that is requested by the user equipment and is sent by the unicast service network element, where the video bit rate class information includes 688 kbps, 1427 kbps, and 2056 kbps.

S502: The transmission conversion apparatus sends the video service information to a base station, so that the base station generates decision information according to the video service information and acquired channel quality information of each user equipment, where the base station is a primary base station selected by a selection apparatus.

Specifically, the transmission conversion apparatus may send the video service information to the base station by using a preset IP network-based interface. The video service information includes the address of the video data requested by the user equipment and the video bit rate class information corresponding to the address of the video data, and the bit rate class information includes at least one bit rate corresponding to the video data. The IP network-based interface is an interface configured to connect the base station and the transmission conversion apparatus.

Because the transmission conversion apparatus is a newly added entity, there is no defined interface between the transmission conversion apparatus and the base station for performing communication. Therefore, reference may be made to an existing interface between a multimedia broadcast multicast gateway and the base station, where the interface is a pure user-plane interface and is an IP network-based interface, so that an interface defined between the transmission conversion apparatus and the base station is the same as the interface defined between the multimedia broadcast multicast gateway and the base station.

After the transmission conversion apparatus sends the video service information to the base station, the base station may generate the decision information according to the video service information, the acquired channel quality information of each user equipment, and a capacity maximization rule. For a specific implementation procedure in which the base station generates the decision information, reference may be made to the method embodiments corresponding to FIG. 13 to FIG. 16, and details are not described herein.

S503: The transmission conversion apparatus receives the decision information sent by the base station, and separately sends the decision information to the unicast service network element and a multicast service network element, so that the unicast service network element and the multicast service network element perform unicast transmission for video data and perform multicast transmission for video data respectively.

Specifically, after the base station generates the decision information, the transmission conversion apparatus may receive the decision information sent by the base station, and separately send the decision information to the unicast service network element and the multicast service network element, so that the unicast service network element and the multicast service network element perform the unicast transmission for the video data and perform the multicast transmission for the video data respectively. The decision information includes a transmission mode of the video data and a transmission bit rate of the video data. In this case, the unicast service network element may perform, at a current transmission bit rate, unicast transmission for the corresponding DASH video data according to the transmission mode and the transmission bit rate that are of the video data and that are included in the decision information; the multicast service network element may perform, at a current transmission bit rate, multicast transmission for the corresponding DASH video data according to the transmission mode and the transmission bit rate that are of the video data and that are included in the decision information. For example, video data requested by a small quantity of users may be transmitted in a unicast transmission mode; and video data requested by a large quantity of users at the same time may be transmitted in a multicast transmission mode, for example, may be transmitted in an MBSFN transmission mode. In this transmission mode, frequency resources can be reduced, and spectrum utilization can be increased, so that a DASH service can better use a radio resource such as network bandwidth.

The unicast service network element may be a DASH Proxy network element, and the multicast service network element may be a BM-SC network element. The transmission conversion apparatus is a newly added control management entity configured to perform unicast and multicast conversion for a DASH service. The transmission conversion apparatus may be disposed in an entity such as a DASH Proxy network element, a BM-SC network element, or a P-GW.

It can be seen from the foregoing that, according to this embodiment of the present invention, decision information may be generated by collecting channel quality information and video service information of user equipment and based on a capacity maximization rule, so that a unicast service network element and a multicast service network element may control, according to the decision information, corresponding DASH video data to be transmitted by means of unicast and by means of multicast respectively. Therefore, a DASH service that supports a hybrid unicast and multicast transmission mode can better use a radio resource such as network bandwidth, and provide higher video quality for users, so as to meet various user requirements.

Figure 18:
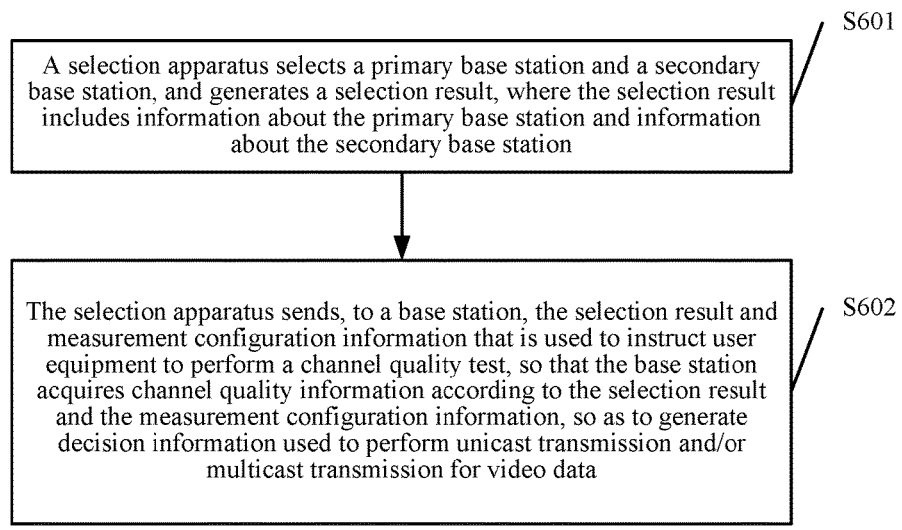
FIG. 18 is a schematic flowchart of yet another video data transmission method according to an embodiment of the present invention.

Further referring to FIG. 18, FIG. 18 is a schematic flowchart of yet another video data transmission method according to an embodiment of the present invention. The method includes:

S601: A selection apparatus selects a primary base station and a secondary base station, and generates a selection result, where the selection result includes information about the primary base station and information about the secondary base station.

Specifically, the selection apparatus may be an MME network element or an MCE network element. The step of selecting, by a selection apparatus, a primary base station and a secondary base station may include: randomly selecting a base station in a network as the primary base station, and using another base station in the network as the secondary base station; or selecting, in a network, a base station that is connected to a largest quantity of user equipments as the primary base station, and using another base station in the network as the secondary base station; or selecting, in a network, a base station that provides best hardware performance as the primary base station, and using another base station in the network as the secondary base station. The selection apparatus may select the primary base station and the secondary base station, and generate the selection result, where the selection result includes the information about the primary base station and the information about the secondary base station.

S602: The selection apparatus sends, to a base station, the selection result and measurement configuration information that is used to instruct user equipment to perform a channel quality test, so that the base station acquires channel quality information according to the selection result and the measurement configuration information, so as to generate decision information used to perform unicast transmission and/or multicast transmission for video data.

The selection apparatus may further generate the measurement configuration information, where the measurement configuration information includes measurement parameters of unicast and multicast channel quality, or has a measurement parameter only of unicast channel quality; and the measurement configuration information may further include a measurement period. The selection apparatus may send the selection result and the measurement configuration information to the base station, so that the base station acquires the channel quality information according to the selection result and the measurement configuration information, so as to generate the decision information used to perform the unicast transmission and/or the multicast transmission for the video data. The base station generates the decision information according to video service information acquired from a transmission conversion apparatus, acquired channel quality information of each user equipment, and a capacity maximization rule, and separately sends the decision information to a unicast service network element and a multicast service network element, so that the unicast service network element and the multicast service network element perform the unicast transmission for the video data and perform the multicast transmission for the video data respectively. For a specific implementation procedure in which the base station generates the decision information, reference may be made to the method embodiments corresponding to FIG. 13 to FIG. 16, and details are not described herein.

The selection apparatus receives identity information and an ECGI that are of the user equipment corresponding to the present selection apparatus and that are sent by a PCRF policy and charging rules function network element.

The selection apparatus obtains, by searching according to the identity information and the ECGI of the user equipment, the base station corresponding to the user equipment, and sends the identity information of the user equipment to the corresponding base station.

Specifically, before the selection apparatus sends the selection result, the selection apparatus may search, according to the identity information and the ECGI that are of the user equipment and that are sent by the PCRF network element, for the base station corresponding to the user equipment, and send the identity information of the user equipment to the corresponding base station, so that when collecting the channel quality information of the user equipment, each base station may instruct the user equipment that is indicated by the received identity information of the user equipment to perform measurement, where the identity information of the user equipment refers to identity information of user equipment that requests DASH video data.

The identity information and the ECGI of the user equipment are obtained by the PCRF policy and charging rules function network element by searching according to a user equipment network address sent by the unicast service network element.

Before the selection apparatus receives the identity information and the ECGI that are of the user equipment and that are sent by the PCRF network element, the unicast service network element may send known user equipment information to the PCRF network element, so that the PCRF network element may query, according to the user equipment information, for the identity information and the ECGI of the corresponding user equipment. The PCRF network element may obtain, by querying according to the identity information and the ECGI of the user equipment, the selection apparatus to which the user equipment belongs, and send the identity information of the user equipment to the corresponding selection apparatus. The unicast service network element may be a DASH Proxy network element. For example, the DASH Proxy network element sends a user equipment network address to the PCRF network element. Then the PCRF network element queries for the identity information and the ECGI of the corresponding user equipment according to the user equipment network address; determines, according to the identity information and the ECGI of the corresponding user equipment, the MME network element to which the user equipment belongs; and sends the identity information and the ECGI of the corresponding user equipment to the MME network element by using a serving gateway. The MME network element determines, according to identity information of all base stations in the network, a base station corresponding to identity information of each user equipment, and sends the identity information of each user equipment to the base station corresponding to the user equipment.

It can be seen from the foregoing that, according to this embodiment of the present invention, decision information may be generated by collecting channel quality information and video service information of user equipment and based on a capacity maximization rule, so that a unicast service network element and a multicast service network element may control, according to the decision information, corresponding DASH video data to be transmitted by means of unicast and by means of multicast respectively. Therefore, a DASH service that supports a hybrid unicast and multicast transmission mode can better use a radio resource such as network bandwidth, and provide higher video quality for users, so as to meet various user requirements.

The following describes, in detail, a process of a video data transmission method provided in the present invention.

A unicast service network element sends acquired user equipment information to a PCRF network element.

The PCRF network element queries for identity information and an ECGI of corresponding user equipment according to the user equipment information.

The PCRF sends the identity information and the ECGI that are of the user equipment and that are obtained by querying to a corresponding selection apparatus.

The selection apparatus determines a correspondence between each user equipment and each base station according to the identity information and the ECGI of the user equipment.

The selection apparatus sends the identity information of the user equipment to each corresponding base station according to the correspondence, so that each base station may know user equipment that is connected to the base station and that requests DASH video data.

The selection apparatus selects a primary base station and a secondary base station, generates a selection result, and sends the selection result and measurement configuration information to the primary base station indicated in the selection result.

The unicast service network element sends acquired DASH video service information to a transmission conversion apparatus.

The primary base station acquires the DASH video service information in the transmission conversion apparatus, and instructs, according to the measurement configuration information, the user equipment that requests the DASH video data and the secondary base station to collect channel quality information, where the user equipment and the secondary base station are connected to the primary base station.

The primary base station generates decision information according to a capacity maximization rule, the channel quality information, and the DASH video service information, and sends the decision information to the unicast service network element and a multicast service network element.

The unicast service network element controls, according to the decision information, corresponding DASH video data to be transmitted in a unicast transmission mode.

The multicast service network element controls, according to the decision information, corresponding DASH video data to be transmitted in a multicast transmission mode.

It can be seen from the foregoing that, according to this embodiment of the present invention, decision information may be generated by collecting channel quality information and video service information of user equipment and based on a capacity maximization rule, so that a unicast service network element and a multicast service network element may control, according to the decision information, corresponding DASH video data to be transmitted by means of unicast and by means of multicast respectively. Therefore, a DASH service that supports a hybrid unicast and multicast transmission mode can better use a radio resource such as network bandwidth, and provide higher video quality for users, so as to meet various user requirements.

An embodiment of the present invention further provides a computer storage medium. The computer storage medium may store a program. When the program is executed, some or all of the steps of the video data transmission method recorded in the method embodiments in FIG. 13 to FIG. 16 are included.

An embodiment of the present invention further provides another computer storage medium. The computer storage medium may store a program. When the program is executed, some or all of the steps of the video data transmission method recorded in the method embodiment in FIG. 17 are included.

An embodiment of the present invention further provides still another computer storage medium. The computer storage medium may store a program. When the program is executed, some or all of the steps of the video data transmission method recorded in the method embodiment in FIG. 18 are included.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), a random access memory (RAM), or the like.

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A base station, comprising a processor, a communications interface, and a memory, wherein:
   the communications interface is configured to communicate with a transmission conversion apparatus, a selection apparatus, user equipment, and a secondary base station;
   the memory is configured to store a program; and
   the processor is configured to execute the program, so as to implement:
   when receiving information about a selection result and measurement configuration information that is used to instruct the user equipment to perform a channel quality test, wherein the information about the selection result and the measurement configuration information are sent by the selection apparatus, determining, according to the selection result, that the present base station is a primary base station, wherein the selection result comprises information about a primary base station and a secondary base station that are selected by the selection apparatus;
   sending the measurement configuration information to user equipment and a secondary base station that are connected to the present base station, and receiving channel quality information that is of user equipment connected to the secondary base station and that is fed back, according to the measurement configuration information, by the user equipment and the secondary base station that are connected to the present base station; and
   generating decision information according to the channel quality information and video service information that is acquired from the transmission conversion apparatus, and sending the decision information to the transmission conversion apparatus, so that the transmission conversion apparatus instructs, according to the decision information, a unicast service network element to perform unicast transmission for video data and/or instructs, according to the decision information, a multicast service network element to perform multicast transmission for video data, wherein:
   the decision information comprises a transmission mode and a transmission bit rate of the video data.

2. The base station according to claim 1, wherein the processor is further configured to:
   acquire the video service information from the transmission conversion apparatus by using a preset IP network-based interface, wherein:

the video service information comprises an address of the video data requested by the user equipment and video bit rate class information corresponding to the address of the video data, wherein the bit rate class information comprises at least one bit rate corresponding to the video data; and the IP network-based interface is an interface configured to connect the base station and the transmission conversion apparatus.

3. The base station according to claim 1, wherein:
the channel quality information of the user equipment connected to the secondary base station is obtained, by the user equipment connected to the secondary base station, by performing measurement according to the measurement configuration information sent by the secondary base station.

4. The base station according to claim 3, wherein the processor is specifically configured to:
select the transmission mode of the video data according to the channel quality information and the video service information that is acquired from the transmission conversion apparatus;
select the transmission bit rate of the video data according to the channel quality information and the video service information that is acquired from the transmission conversion apparatus; and
send, to the transmission conversion apparatus, the decision information that carries the transmission mode of the video data and the transmission bit rate of the video data.

5. The base station according to claim 4, wherein the processor is specifically configured to:
select, in the video bit rate class information comprised in the video service information and according to the channel quality information, a minimum bit rate that the video data can meet in both the unicast transmission and the multicast transmission as a reference bit rate;
calculate a first total resource consumed at the reference bit rate in a unicast transmission mode, and calculate a second total resource consumed at the reference bit rate in a multicast transmission mode; and
select, by comparing the first total resource with the second total resource, a transmission mode in which a minimum total resource is consumed as the transmission mode of the video data.

6. The base station according to claim 5, wherein the processor is specifically configured to:
separately calculate, according to the channel quality information and the video bit rate class information that is comprised in the video service information, a unit consumed resource that is of each piece of video data in the selected transmission mode and that is corresponding to each bit rate in the video bit rate class information, wherein the unit consumed resource is a resource consumed in each timeslot;
separately calculate a calculation ratio of a peak signal to noise ratio of each piece of video data at each bit rate to a corresponding unit consumed resource;
generate, according to the calculation ratio, a sorting result of each piece of video data that is corresponding to each bit rate, and traverse the sorting result in a descending order;
select, in a traversal procedure, a minimum calculation ratio that can meet a preset resource condition; and
separately select, according to video data corresponding to a calculation ratio that is greater than or equal to the minimum calculation ratio that can meet the preset resource condition, a current maximum transmission bit rate corresponding to each piece of video data, wherein:

a calculation ratio corresponding to the current maximum transmission bit rate of each piece of video data is greater than or equal to the minimum calculation ratio that can meet the preset resource condition; and the preset resource condition is that: a resource consumed in the multicast transmission mode is less than a first subframe quantity threshold, and total resources consumed in the multicast transmission mode and the unicast transmission mode are less than a second subframe quantity threshold.

7. The base station according to claim 4, wherein:
the channel quality information comprises a signal to interference plus noise ratio (SINR) parameter measured by the user equipment in the unicast transmission mode, and a signal to interference plus noise ratio parameter measured by the user equipment in the multicast transmission mode; or the channel quality information comprises a signal to interference plus noise ratio parameter measured by the user equipment in the unicast transmission mode, and channel quality of the present base station in the multicast transmission mode, wherein user equipment coverage of the present base station in the multicast transmission mode exceeds a preset coverage threshold.

8. The base station according to claim 4, wherein the processor is further configured to:
when a measurement time interval reaches a measurement period comprised in the measurement configuration information, receive updated channel quality information, and update the decision information so as to update the transmission bit rate of the video data.

9. The base station according to claim 1, wherein the processor is further configured to:
send primary base station identity information to the transmission conversion apparatus, so that the transmission conversion apparatus determines, according to the primary base station identity information, that the present base station is the primary base station.

10. A selection apparatus, comprising a processor, a communications interface, and a memory, wherein:
the communications interface is configured to communicate with a PCRF policy and charging rules function network element and a base station;
the memory is configured to store a program; and
the processor is configured to execute the program, so as to implement:
selecting a primary base station and a secondary base station, and generating a selection result, wherein the selection result comprises information about the primary base station and information about the secondary base station; and
sending, to a base station, the selection result and measurement configuration information that is used to instruct user equipment to perform a channel quality test, so that the base station acquires channel quality information according to the selection result and the measurement configuration information, so as to generate decision information used to perform unicast transmission and/or multicast transmission for video data, wherein:
the base station that receives the selection result is a base station corresponding to the information about the primary base station in the selection result.

11. The apparatus according to claim 10, wherein the processor is specifically configured to:
- randomly select a base station in a network as the primary base station, and use another base station in the network as the secondary base station; or
- select, in a network, a base station that is connected to a largest quantity of user equipments as the primary base station, and use another base station in the network as the secondary base station; or
- select, in a network, a base station that provides best hardware performance as the primary base station, and use another base station in the network as the secondary base station.

12. The apparatus according to claim 10, wherein the processor is further configured to:
- receive identity information and an E-UTRAN cell global identifier (ECGI) that are of user equipment corresponding to the present selection apparatus and that are sent by the policy and charging rules function (PCRF) network element; and
- obtain, by searching according to the identity information and the ECGI of the user equipment, a base station corresponding to the user equipment, and send the identity information of the user equipment to the corresponding base station, wherein:
- the identity information and the ECGI of the user equipment are obtained by the PCRF network element by searching according to a user equipment network address sent by a unicast service network element.

13. A video data transmission method, comprising:
- when a base station receives information about a selection result and measurement configuration information that is used to instruct user equipment to perform a channel quality test, wherein the information about the selection result and the measurement configuration information are sent by a selection apparatus, determining, by the base station according to the selection result, that the present base station is a primary base station, wherein the selection result comprises information about a primary base station and a secondary base station that are selected by the selection apparatus;
- sending, by the base station, the measurement configuration information to user equipment and a secondary base station that are connected to the present base station, and receiving channel quality information that is of user equipment connected to the secondary base station and that is fed back, according to the measurement configuration information, by the user equipment and the secondary base station that are connected to the present base station; and
- generating, by the base station, decision information according to the channel quality information and video service information that is acquired from a transmission conversion apparatus, and sending the decision information to the transmission conversion apparatus, so that the transmission conversion apparatus instructs, according to the decision information, a unicast service network element to perform unicast transmission for video data and/or instructs, according to the decision information, a multicast service network element to perform multicast transmission for video data, wherein:
- the decision information comprises a transmission mode and a transmission bit rate of the video data.

14. The method according to claim 13, wherein before the step of generating, by the base station, decision information according to the channel quality information and video service information that is acquired from a transmission conversion apparatus, and sending the decision information to the transmission conversion apparatus, the method further comprises:
- acquiring, by the base station, the video service information from the transmission conversion apparatus by using a preset IP network-based interface, wherein:
- the video service information comprises an address of the video data requested by the user equipment and video bit rate class information corresponding to the address of the video data, wherein the bit rate class information comprises at least one bit rate corresponding to the video data; and
- the IP network-based interface is an interface configured to connect the base station and the transmission conversion apparatus.

15. The method according to claim 13, wherein:
- the channel quality information of the user equipment connected to the secondary base station is obtained, by the user equipment connected to the secondary base station, by performing measurement according to the measurement configuration information sent by the secondary base station.

16. The method according to claim 15, wherein the generating, by the base station, decision information according to the channel quality information and video service information that is acquired from a transmission conversion apparatus, and sending the decision information to the transmission conversion apparatus comprises:
- selecting, by the base station, the transmission mode of the video data according to the channel quality information and the video service information that is acquired from the transmission conversion apparatus;
- selecting, by the base station, the transmission bit rate of the video data according to the channel quality information and the video service information that is acquired from the transmission conversion apparatus; and
- sending, by the base station, to the transmission conversion apparatus, the decision information that carries the transmission mode of the video data and the transmission bit rate of the video data.

17. The method according to claim 16, wherein the selecting, by the base station, the transmission mode of the video data according to the channel quality information and the video service information that is acquired from the transmission conversion apparatus comprises:
- selecting, by the base station, in the video bit rate class information comprised in the video service information and according to the channel quality information, a minimum bit rate that the video data can meet in both the unicast transmission and the multicast transmission as a reference bit rate;
- calculating, by the base station, a first total resource consumed at the reference bit rate in a unicast transmission mode, and calculating a second total resource consumed at the reference bit rate in a multicast transmission mode; and
- selecting, by the base station by comparing the first total resource with the second total resource, a transmission mode in which a minimum total resource is consumed as the transmission mode of the video data.

18. The method according to claim 17, wherein the selecting, by the base station, the transmission bit rate of the video data according to the channel quality information and the video service information that is acquired from the transmission conversion apparatus comprises:

separately calculating, by the base station according to the channel quality information and the video bit rate class information that is comprised in the video service information, a unit consumed resource that is of each piece of video data in the selected transmission mode and that is corresponding to each bit rate in the video bit rate class information, wherein the unit consumed resource is a resource consumed in each timeslot;

separately calculating, by the base station, a calculation ratio of a peak signal to noise ratio of each piece of video data at each bit rate to a corresponding unit consumed resource;

generating, by the base station according to the calculation ratio, a sorting result of each piece of video data that is corresponding to each bit rate, and traversing the sorting result in a descending order;

selecting, by the base station, in a traversal procedure, a minimum calculation ratio that can meet a preset resource condition; and separately selecting, by the base station according to video data corresponding to a calculation ratio that is greater than or equal to the minimum calculation ratio that can meet the preset resource condition, a current maximum transmission bit rate corresponding to each piece of video data, wherein:

a calculation ratio corresponding to the current maximum transmission bit rate of each piece of video data is greater than or equal to the minimum calculation ratio that can meet the preset resource condition; and the preset resource condition is that: a resource consumed in the multicast transmission mode is less than a first subframe quantity threshold, and total resources consumed in the multicast transmission mode and the unicast transmission mode are less than a second subframe quantity threshold.

19. The method according to claim 16, wherein:

the channel quality information comprises a signal to interference plus noise ratio (SINR) parameter measured by the user equipment in the unicast transmission mode, and a signal to interference plus noise ratio parameter measured by the user equipment in the multicast transmission mode; or the channel quality information comprises a signal to interference plus noise ratio parameter measured by the user equipment in the unicast transmission mode, and channel quality of the present base station in the multicast transmission mode, wherein user equipment coverage of the present base station in the multicast transmission mode exceeds a preset coverage threshold.

20. The method according to claim 16, further comprising:

when a measurement time interval reaches a measurement period comprised in the measurement configuration information, receiving, by the base station, updated channel quality information, and updating the decision information so as to update the transmission bit rate of the video data.

* * * * *